(12) United States Patent
Noh et al.

(10) Patent No.: US 12,143,332 B2
(45) Date of Patent: Nov. 12, 2024

(54) METHOD AND APPARATUS FOR SETTING OCCUPATION TIME OF CHANNEL STATE INFORMATION PROCESSING UNIT OF TERMINAL IN WIRELESS COMMUNICATION SYSTEM

(71) Applicant: Samsung Electronics Co., Ltd., Suwon-si (KR)

(72) Inventors: Hoondong Noh, Suwon-si (KR); Heecheol Yang, Suwon-si (KR); Hyoungju Ji, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/626,228

(22) PCT Filed: Jul. 9, 2020

(86) PCT No.: PCT/KR2020/009018
§ 371 (c)(1),
(2) Date: Jan. 11, 2022

(87) PCT Pub. No.: WO2021/010657
PCT Pub. Date: Jan. 21, 2021

(65) Prior Publication Data
US 2022/0278802 A1 Sep. 1, 2022

(30) Foreign Application Priority Data
Jul. 12, 2019 (KR) .................. 10-2019-0084603

(51) Int. Cl.
*H04W 72/232* (2023.01)
*H04L 5/00* (2006.01)

(52) U.S. Cl.
CPC .......... *H04L 5/0051* (2013.01); *H04L 5/0096* (2013.01)

(58) Field of Classification Search
CPC ...... H04W 72/232; H04W 8/22; H04W 24/02
See application file for complete search history.

(56) References Cited

U.S. PATENT DOCUMENTS

2019/0215781 A1\* 7/2019 Jeon ...................... H04W 76/32
2021/0242918 A1 8/2021 Kim et al.

FOREIGN PATENT DOCUMENTS

KR 10-2019-0062325 A 6/2019
WO 2016/122391 A1 8/2016

OTHER PUBLICATIONS

3GPP; 3rd Generation Partnership Project; Technical Specification Group Radio Access Network; NR; Physical layer procedures for data (Release 15); 3GPP TS 38.214; V15.6.0; Jun. 2019; Valbonne, France.

(Continued)

*Primary Examiner* — Tu X Nguyen
(74) *Attorney, Agent, or Firm* — Jefferson IP Law, LLP

(57) ABSTRACT

A method, performed by a terminal, of determining a channel state information processing unit (CPU) occupation time in a wireless communication system, according to an embodiment of the present disclosure, includes: receiving, from a base station, information indicating activation of a semi-persistent channel state information (CSI) report; receiving, from the base station, at least one CSI-reference signal (RS) for the semi-persistent CSI report; and determining a CPU occupation time for the semi-persistent CSI report based on at least one of a reception time point of the information indicating the activation of the semi-persistent CSI report or a reception time point of the at least one CSI-RS. The information indicating the activation of the semi-persistent CSI report is transmitted by being included (Continued)

in downlink control information (DCI) or a media access control control element (MAC CE).

20 Claims, 19 Drawing Sheets

(56) References Cited

OTHER PUBLICATIONS

3GPP; 3rd Generation Partnership Project; Technical Specification Group Radio Access Network; NR; Medium Access Control (MAC) protocol specification (Release 15); 3GPP TS 38.321; V15.6.0; Jun. 2019; Valbonne, France.
NOKIA; Corrections to 38.214 including alignment of terminology across specifications; 3GPP TSG RAN WG1 #97; R1-1907867; May 13-17, 2019; Reno, Nevada, U.S.A.
NOKIA; Corrections to 38.214 regarding the MAC CE activation/deactivation timing in mixed numerology scenario; 3GPP TSG-RAN/WG1 Meeting #97; R1-1907962; Reno, Nevada, U.S.A.
International Search Report with Written Opinion and English translation dated Oct. 15, 2020; International Appln. No. PCT/KR2020/009018.

* cited by examiner

METHOD AND APPARATUS FOR SETTING OCCUPATION TIME OF CHANNEL STATE INFORMATION PROCESSING UNIT OF TERMINAL IN WIRELESS COMMUNICATION SYSTEM

TECHNICAL FIELD

The present disclosure relates to a method and apparatus for setting an occupation time of channel state information (CSI) processing unit (CPU) of a terminal in a wireless communication system.

BACKGROUND ART

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed.

Also, in order to improve a system network for 5G communication, systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As mobile communication systems are developed, various services may be provided. Therefore, there is a particular need to provide a method of enabling a terminal to efficiently perform a channel state information (CSI) report.

DESCRIPTION OF EMBODIMENTS

Solution to Problem

According to an embodiment of the present disclosure, a method and apparatus for setting an occupation time of channel state information (CSI) processing unit (CPU) of a terminal in a wireless communication system may be provided.

BEST MODE

Figure 1:
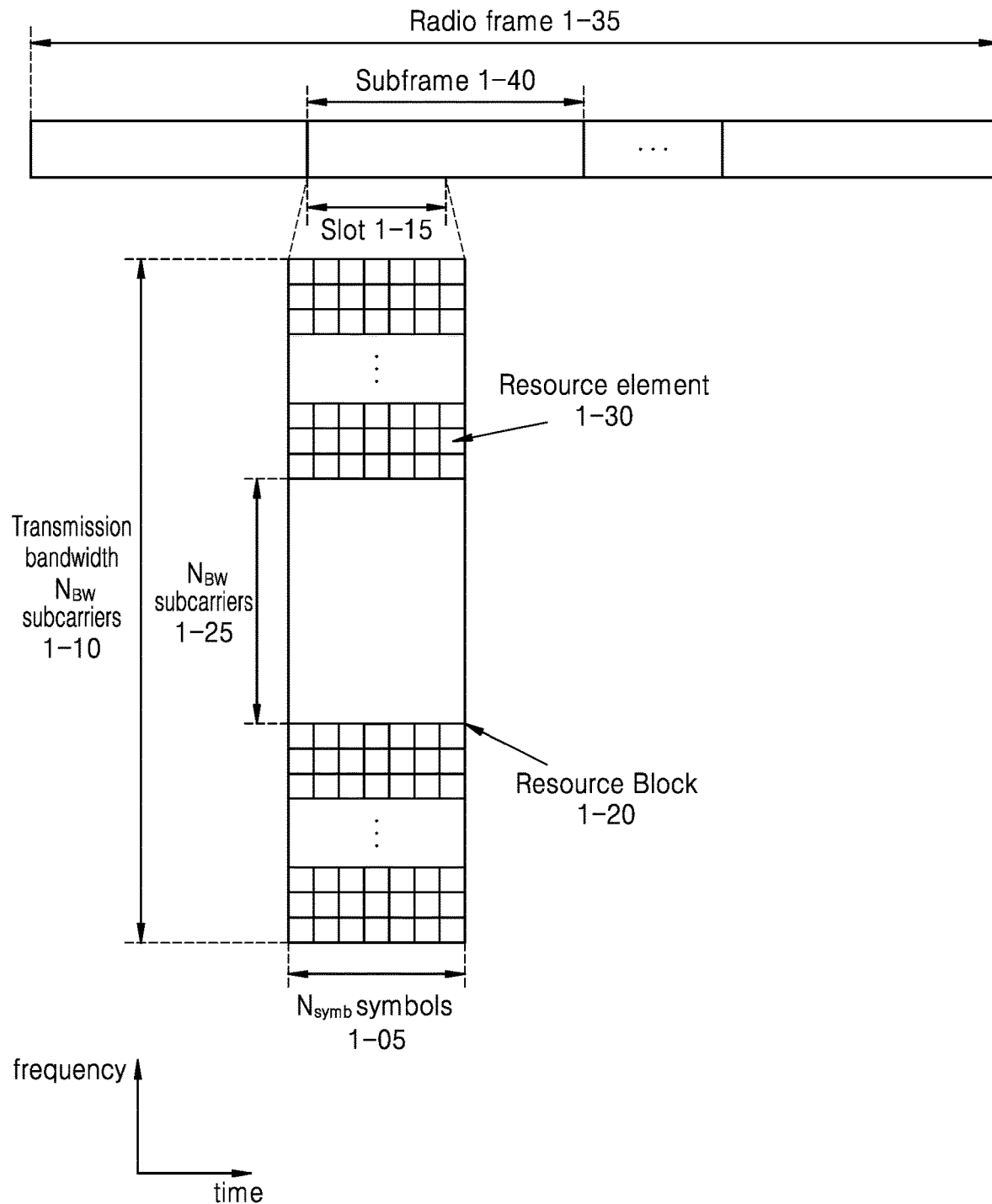
FIG. 1 is a diagram illustrating a time-frequency domain transmission structure of a long term evolution (LTE), long term evolution-advanced (LTE-A), new radio (NR), or wireless communication system similar thereto, according to an embodiment of the present disclosure.

A method, performed by a base station, of configuring a channel state information processing unit (CPU) occupation time of a terminal in a wireless communication system, according to an embodiment of the present disclosure, may include: indicating whether to activate a semi-persistent channel state information (CSI) report to the terminal through higher layer signaling or downlink control information (DCI); determining a CPU occupation time interval of the terminal based on the indication of whether to activate the semi-persistent CSI report; and transmitting, to the terminal, information for configuring the determined CPU occupation time interval of the terminal.

A method, performed by a terminal, of determining a channel state information processing unit (CPU) occupation time in a wireless communication system, according to an embodiment of the present disclosure, may include: receiving, from a base station, information indicating activation of a semi-persistent channel state information (CSI) report; receiving, from the base station, at least one CSI-reference signal (RS) for the semi-persistent CSI report; and determining a CPU occupation time for the semi-persistent CSI report based on at least one of a reception time point of the information indicating the activation of the semi-persistent CSI report or a reception time point of the at least one CSI-RS, wherein the information indicating the activation of the semi-persistent CSI report is transmitted by being included in downlink control information (DCI) or a media access control control element (MAC CE).

According to an embodiment of the present disclosure, the determining of the CPU occupation time may include determining, as a start time point of the CPU occupation time, a reception time point (first time point) of a first symbol of a last CSI-RS received in a slot that is not later than a reference slot in which reference resource for channel information measurement reported in the semi-persistent CSI report is located among the at least one CSI-RS.

According to an embodiment of the present disclosure, the determining of the CPU occupation time may include determining, as a start time point of the CPU occupation time, a time point (second time point) when reception of the DCI indicating the activation of the semi-persistent CSI report is completed or a symbol (third time point) located after a decoding time for the DCI from the second time point.

According to an embodiment of the present disclosure, the determining of the CPU occupation time may include determining, as a start time point of the CPU occupation time, a time point (fourth time point) after a MAC CE activation delay, which is a time required for the MAC CE to be applied to the terminal, from a time point when HARQ-ACK transmission for the MAC CE indicating the activation of the semi-persistent CSI report is completed.

According to an embodiment of the present disclosure, the method may further include transmitting the semi-persistent CSI report to the base station, wherein the determining of the CPU occupation time may include determining, as a start time point of the CPU occupation time, a time point when the transmission of the semi-persistent CSI report to the base station is completed.

According to an embodiment of the present disclosure, the method may further include receiving, from the base station, information indicating deactivation of the semi-persistent CSI report, wherein the determining of the CPU occupation time may include determining an end time point of the CPU occupation time based on a reception time point of the information indicating the deactivation of the semi-persistent CSI report, and the information indicating the deactivation of the semi-persistent CSI report may be transmitted by being included in another DCI or another MAC CE.

According to an embodiment of the present disclosure, the determining of the end time point of the CPU occupation time may include determining, as the end time point of the CPU occupation time, a time point (fifth time point) when reception of the other DCI indicating the deactivation of the semi-persistent CSI report is completed or a symbol (sixth time point) located after a decoding time for the other DCI from the fifth time point.

According to an embodiment of the present disclosure, the determining of the end time point of the CPU occupation time may include determining, as the end time point of the CPU occupation time, a time point (seventh time point) when HARQ-ACK transmission for the other MAC CE indicating the deactivation of the semi-persistent CSI report is completed, or a time point (eighth time point) after another MAC CE activation delay, which is a time required for the other MAC CE to be applied to the terminal from the seventh time point.

According to an embodiment of the present disclosure, the determining of the end time point of the CPU occupation time may include determining, as the end time point of the CPU occupation time, a transmission start time point (ninth time point) or a transmission completion time point (tenth time point) scheduled for the deactivated semi-persistent CSI report.

According to an embodiment of the present disclosure, the determining of the CPU occupation time may include: determining a plurality of time intervals indicating the CPU occupation time based on at least one of the reception time point of the information indicating the activation of the semi-persistent CSI report, the reception time point of the at least one CSI-RS, a reception time point of information indicating deactivation of the semi-persistent CSI report, a transmission time point of the semi-persistent CSI report, or a transmission scheduled time point of the semi-persistent CSI report; and determining one of the plurality of time intervals as the CPU occupation time based on a comparison between the plurality of time intervals.

According to an embodiment of the present disclosure, the method may further include receiving information indicating the CPU occupation time for the deactivated semi-persistent CSI report or information indicating the method of determining the CPU occupation time from the base station through higher layer signaling or the other DCI, wherein the determining of the CPU occupation time may include determining, as the CPU occupation time, a CPU occupation time indicated by the base station.

According to an embodiment of the present disclosure, the method may further include transmitting the semi-persistent CSI report to the base station, wherein the transmitting of the semi-persistent CSI report to the base station may include transmitting the semi-persistent CSI report to the base station even when information indicating deactivation of the semi-persistent CSI report is received after a start time point of the determined CPU occupation time.

A terminal for determining a channel state information processing unit (CPU) occupation time in a wireless communication system, according to an embodiment of the present disclosure, may include: a transceiver; and at least one processor configured to: control the transceiver to receive, from a base station, information indicating activation of a semi-persistent channel state information (CSI) report; control the transceiver to receive, from the base station, at least one CSI-reference signal (RS) for the semi-persistent CSI report; and determine a CPU occupation time for the semi-persistent CSI report based on at least one of a reception time point of the information indicating the activation of the semi-persistent CSI report or a reception time point of the at least one CSI-RS. The information indicating the activation of the semi-persistent CSI report may be transmitted by being included in downlink control information (DCI) or a media access control control element (MAC CE).

MODE OF DISCLOSURE

Hereinafter, embodiments of the present disclosure will be described in detail with reference to the accompanying drawings.

In describing the embodiments, descriptions of technical contents that are well known in the technical field to which the present disclosure pertains and are not directly related to the present disclosure will be omitted. By omitting unnecessary description, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Advantages and features of the present disclosure, and methods of achieving them will be clarified with reference to embodiments described below in detail with reference to the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "-er/or" as used herein refers to a software element or a hardware element such as field programmable gate array (FPGA) or application specific integrated circuit (ASIC), and the "-er/or" performs certain functions. However, the term "-er/or" is not limited to software or hardware. The term "-er/or" may be configured in an addressable storage medium or may be configured to reproduce one or more processors. Therefore, according to an embodiment of the present disclosure, the term "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "-ers/ors" may be combined with fewer elements and "-ers/ors", or may be separated from additional elements and "-ers/ors." Furthermore, the elements and the "-ers/ors" may be implemented to reproduce one or more central processing units (CPUs) in the device or secure multimedia card. Also, according to an embodiment of the present disclosure, the term "-er/or" may include one or more processors.

Hereinafter, an operation principle of the present disclosure will be described in detail with reference to the accompanying drawings. In describing the present disclosure, when the detailed description of the relevant known functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the specification. Hereinafter, a base station allocates resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smartphone, a computer, a multimedia system capable of performing a communication function, or the like. Of course, the present disclosure is not limited to the above examples.

Hereinafter, a technology for a terminal to receive broadcast information from a base station in a wireless communication system will be described. The present disclosure relates to a communication scheme that converges 5G communication systems for supporting a higher data rate than beyond 4G systems with Internet of things (IoT) technology, and a system thereof. The present disclosure may be applied to intelligent services (e.g., smart homes, smart buildings, smart cities, smart cars or connected cars, health care, digital education, retail, security and safety related services, etc.) based on 5G communication technologies and IoT related technologies.

The term referring to broadcast information, the term referring to control information, the term related to a communication coverage, the term referring to a state change (e.g., events), and the term referring to network entities, the term referring to messages, the terms referring to elements of an apparatus, etc. as used herein are exemplified for convenience of description. Therefore, the present disclosure is not limited to the terms to be described below, and other terms referring to an equivalent technical meaning may be used.

For convenience of description, the terms and names defined in the 3rd generation partnership project long term evolution (3GPP LTE) standard may be used herein. However, the present disclosure is not limited by the terms and names and may be equally applied to systems conforming to other standards.

A wireless communication system has evolved from a system providing voice-oriented services to a broadband wireless communication system providing high speed high quality packet data services of communication standards such as high speed packet access (HSPA) of 3GPP, LTE or evolved universal terrestrial radio access (E-UTRA), LTE-A, LTE-Pro, high rate packet data (HRPD) of 3GPP2, ultra mobile broadband (UMB), and IEEE 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be identified by performing allocation and operation so that time-frequency resources for carrying data or control information for each user do not overlap each other, that is, orthogonality is established.

Future communication systems after LTE, that is, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (mMTC), and ultra reliability low latency communication (URLLC).

According to an embodiment, eMBB aims to provide a data rate higher than a data rate supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. An increased user perceived data rate of a terminal has to be simultaneously provided. In order to satisfy such requirements, there is a need to improve transmission and reception technologies including more improved multi-input multi-output (MIMO) transmission technologies. Also, because a frequency bandwidth wider than 20 MHz is used in 3-6 GHz frequency bands or 6 GHz or higher frequency bands, instead of a 2 GHz bandwidth used by an existing LTE, a data rate required by 5G communication systems may be satisfied.

At the same time, mMTC is under consideration so as to support application services such as IoT in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. URLLC has to provide communications that provide ultra-low latency and ultra-high reliability. For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to allocate a wide resource in a frequency band. However, mMTC, URLLC, and eMBB are only examples of different service types, and the service types to which the present disclosure is applied are not limited to the above-described examples.

The services considered in the 5G communication systems described above have to be provided by convergence with each other based on a single framework. That is, for efficient resource management and control, it is preferable that the respective services are integrated, controlled, and transmitted by a single system rather than being operated independently.

Also, although the embodiments of the present disclosure will be described below with reference to an LTE, LTE-A, LTE Pro, or NR system as an example, the embodiments of the present disclosure may also be applied to other communication systems having a similar technical background or channel form. Also, the present disclosure may be applied to other communication systems through some modifications without departing from the scope of the present disclosure. Hereinafter, the frame structures of the LTE, LTE-A, and 5G systems will be described with reference to the drawings, and the design direction of the 5G system will be described.

FIG. 1 is a diagram illustrating a time-frequency domain transmission structure of an LTE, LTE-A, NR, or wireless communication system similar thereto.

FIG. 1 illustrates a basic structure of a time-frequency resource region, which is a radio resource region through which data or control channels of LTE, LTE-A, and NR systems based on a cyclic prefix (CP) orthogonal frequency division multiplexing (OFDM) (CP-OFDM) or single carrier-frequency division multiple access (SC-FDMA) waveform are transmitted.

In FIG. 1, the horizontal axis represents a time domain, and the vertical axis represents a frequency domain. A UL refers to a radio link through which a UE transmits data or a control signal to a base station, and a DL refers to a radio link through which a base station transmits data or a control signal to a UE.

A minimum transmission unit of the LTE, LTE-A, and 5G systems in the time domain is an OFDM symbol or an SC-FDMA symbol, and $N_{symb}$ symbols 1-05 may be gathered to configure one slot 1-15. In the case of the LTE and the LTE-A, two slots including seven symbols ($N_{symb}=7$) may be gathered to configure one subframe 1-40. Also, according to an embodiment of the present disclosure, the 5G may support two types of slot structures, that is, slot and mini-slot (or non-slot). In the case of a 5G slot, $N_{symb}$ may have a value of 7 or 14, and in the case of a 5G mini-slot, $N_{symb}$ may be set to a value of 1, 2, 3, 4, 5, 6, or 7. In the LTE and the LTE-A, the length of the slot is 0.5 ms and the length of the subframe is fixed to 1.0 ms. However, in the 5G system, the length of the slot or the mini-slot may be flexibly changed according to subcarrier spacing. In the LTE and the LTE-A, a radio frame 1-35 is a time domain unit including ten subframes. In the LTE and the LTE-A, the minimum transmission unit in the frequency domain is a subcarrier in units of 15 kHz (subcarrier spacing=15 kHz), and the entire system transmission bandwidth includes a total of NBW subcarriers 1-10. A flexible extended frame structure of the 5G system will be described below.

A basic unit of a resource in the time-frequency domain is a resource element (RE) 1-30, which may be represented by an OFDM symbol or SC-FDMA symbol index and a subcarrier index. A resource block (RB) 1-20 or a physical resource block (PRB) may be defined as $N_{symb}$ consecutive OFDM symbols or SC-FDMA symbols 1-05 in the time domain and $N_{RB}$ consecutive subcarriers 1-25 in the frequency domain. Therefore, one RB 1-20 includes $N_{symb} \times N_{RB}$ REs 1-30. In the LTE and LTE-A systems, data may be mapped in units of RBs, and the base station may perform scheduling in units of RB pairs constituting one subframe for a certain UE. $N_{symb}$, which is the number of SC-FDMA symbols or the number of OFDM symbols, is determined according to a length of a CP added to each symbol in order to prevent intersymbol interference. For example, when a general CP is applied, $N_{symb}=7$, and when an extended CP is applied, $N_{symb}=6$. Because the extended CP is applied to a system having a relatively greater radio transmission distance than the general CP, orthogonality between symbols may be maintained.

According to an embodiment of the present disclosure, the subcarrier spacing, the length of the CP, etc. are essential information for OFDM transmission and reception, and efficient transmission and reception may be performed only when the base station and the UE recognize the subcarrier spacing, the length of the CP, etc. as common values.

The frame structures of the LTE and LTE-A systems as described above are designed considering typical voice and data communication, and expandability restrictions may follow to satisfy various services and requirements like the 5G system. Therefore, the 5G system needs to define and operate the frame structure flexibly considering various services and requirements.

Figure 2:
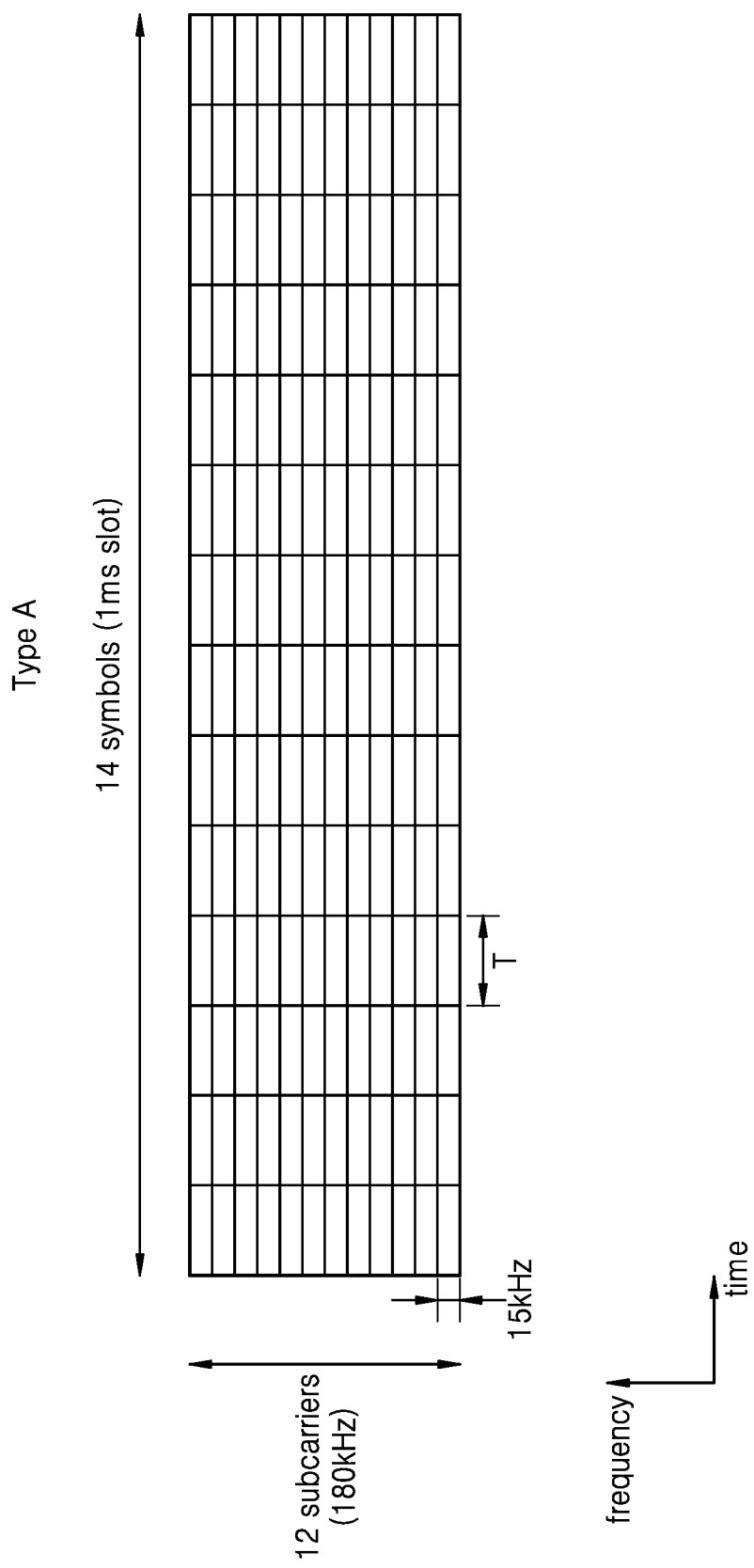
FIG. 2 illustrates an extended frame structure according to an embodiment of the present disclosure.
Figure 3:
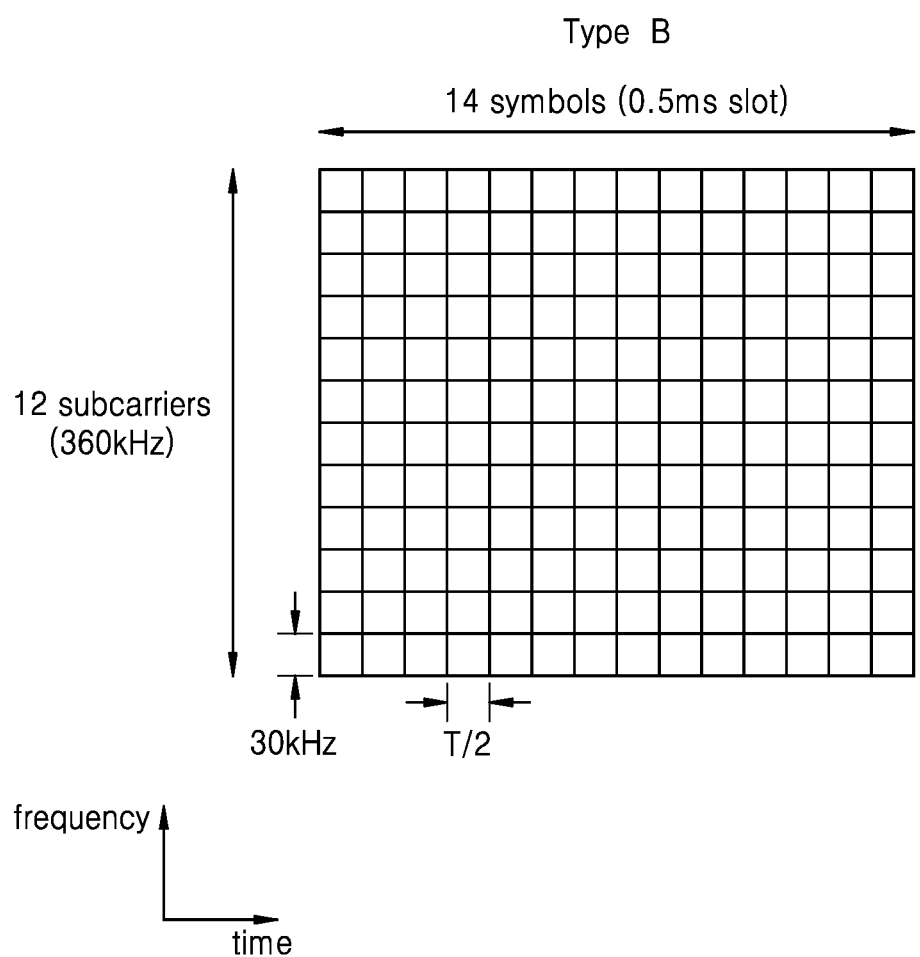
FIG. 3 illustrates an extended frame structure according to an embodiment of the present disclosure.
Figure 4:
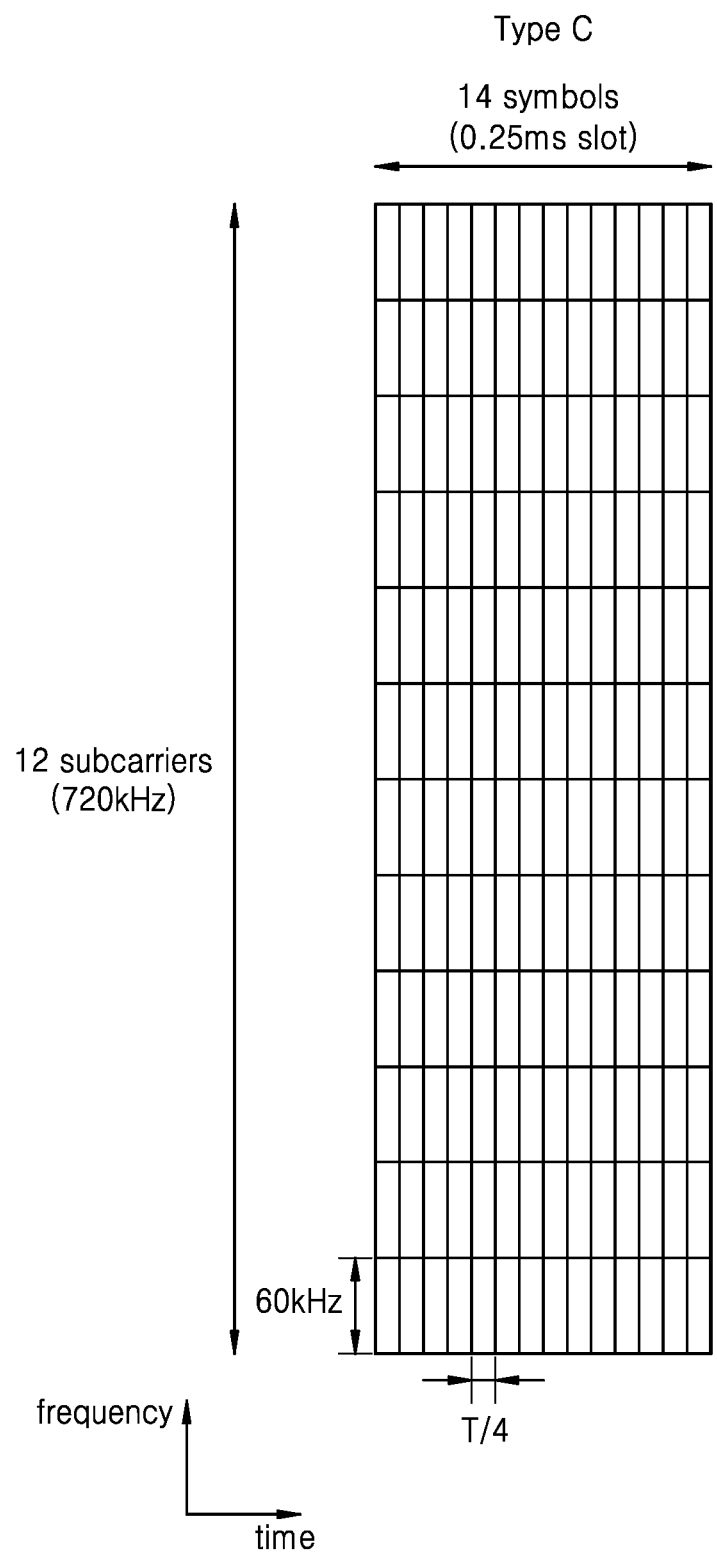
FIG. 4 illustrates an extended frame structure according to an embodiment of the present disclosure.

FIGS. 2 to 4 are diagrams illustrating an extended frame structure according to an embodiment of the present disclosure.

Examples illustrated in FIGS. 2 to 4 are essential parameter sets defining the extended frame structure, which may include subcarrier spacing, a CP length, a slot length, and the like.

At the initial stage of introduction of the 5G system in the future, at least coexistence or dual mode operation with the existing LTE/LTE-A system is expected. In this manner, the existing LTE/LTE-A may provide a stable system operation, and the 5G system may provide improved services. Therefore, the extended frame structure of the 5G system may need to include at least the LTE/LTE-A frame structure or the essential parameter set. FIG. 2 illustrates an essential parameter set or a 5G frame structure such as the LTE/LTE-A frame structure. Frame structure type A illustrated in FIG. 2 shows that the subcarrier spacing is 15 kHz, 14 symbols constitute a 1 ms slot, and 12 subcarriers (=180 kHz=12×15 kHz) constitute a PRB.

Referring to FIG. 3, frame structure type B illustrated in FIG. 3 shows that the subcarrier spacing is 30 kHz, 14 symbols constitute a 0.5 ms slot, and 12 subcarriers (=360 kHz=12×30 kHz) constitute a PRB. That is, frame structure type B of FIG. 3 shows that the subcarrier spacing and the PRB size are increased twice and the slot length and the symbol length are reduced twice, compared with frame structure type A.

Referring to FIG. 4, frame structure type C illustrated in FIG. 4 shows that the subcarrier spacing is 60 kHz, 14 symbols constitute a 0.25 ms subframe, and 12 subcarriers (=720 kHz=12×60 kHz) constitute a PRB. That is, frame structure type C illustrated in FIG. 4 shows that the subcarrier spacing and the PRB size are increased four times and the slot length and the symbol length are reduced four times, compared with frame structure type A.

When the frame structure types are generalized, high expandability may be provided by making essential parameter sets such as the subcarrier spacing, the CP length, and the slot length have an integer multiple relationship for each frame structure type. A subframe having a fixed length of 1 ms may be defined in order to indicate a reference time unit irrelevant to the frame structure type. Therefore, one subframe in frame structure type A includes one slot, one subframe in frame structure type B includes two slots, and one subframe in frame structure type C includes four slots. Of course, the extendable frame structures are not limited to frame structure type A, B, or C described above, and may be applied to other subcarrier spacings such as 120 kHz or 240 kHz and may have different structures from each other.

According to an embodiment of the present disclosure, the frame structure types described above may be applied to correspond to various scenarios. In terms of the cell size, as the CP length is longer, a larger cell may be supported. Thus, frame structure type A may support relatively large cells, compared with frame structure types B and C. In terms of the operating frequency band, as the subcarrier spacing is greater, it is more advantageous to recover phase noise in a high frequency band. Thus, frame structure type C may support a relatively high operating frequency, compared with frame structure types A and B. In terms of the service, the subframe length is shorter, it is more advantageous to support an ultra-low latency service such as URLLC. Thus, frame structure type C may be relatively suitable for URLLC services compared with frame structure types A and B.

Also, a plurality of frame structure types may be multiplexed in a single system for integrated operation.

In the NR, one component carrier (CC) or serving cell may include up to 250 or more RBs. Therefore, when the UE always receives the full serving cell bandwidth as in the LTE, the power consumption of the UE may be extreme. In order to solve this problem, the base station may configure one or more bandwidth parts BWP for the terminal and support the UE to change the reception area within the cell. In the NR, the base station may configure 'initial BWP', which is a bandwidth of control resource set (CORESET) #0 (or common search space CSS)), for the UE through a master information block (MIB). Thereafter, the base station may configure the initial BWP (first BWP) of the UE through radio resource control (RRC) signaling, and may notify at least one piece of BWP configuration information that will be indicated through downlink control information (DCI). Thereafter, the base station may indicate which band to be used by the UE by announcing a BWP ID through DCI. When the UE does not receive DCI in the currently allocated BWP for a specific time or longer, the UE may return to a 'default BWP' and attempt to receive DCI.

Figure 5:
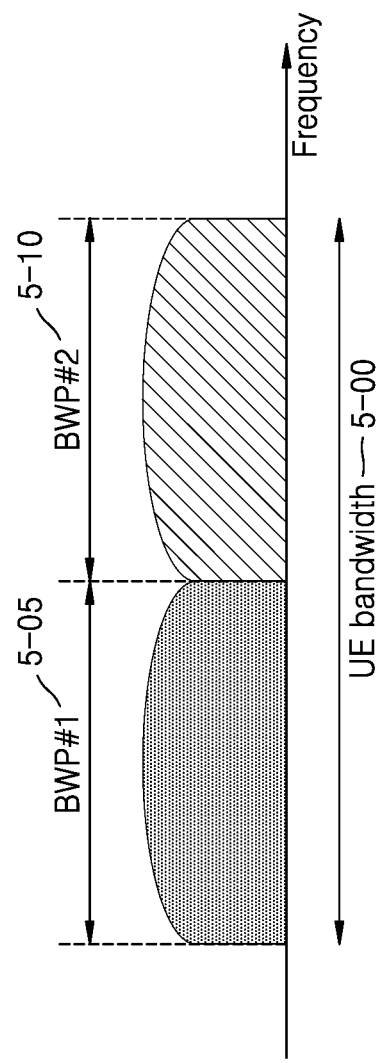
FIG. 5 is a diagram illustrating an example of configuring a bandwidth part in a 5th generation (5G) communication system, according to an embodiment of the present disclosure.

FIG. 5 is a diagram illustrating an example of configuring a bandwidth part in a 5G communication system, according to an embodiment of the present disclosure.

Referring to FIG. 5, a UE bandwidth 5-00 may be configured as two bandwidth parts, i.e., bandwidth part #1 5-05 and bandwidth part #2 5-10. The base station may configure one or more bandwidth parts for the UE, and may configure the following information for each bandwidth part.

TABLE 1

Configuration information 1: Bandwidth of bandwidth part
(number of PRBs constituting bandwidth part)
Configuration information 2: Frequency position of
bandwidth part (examples of such information include
offset value relative to reference point, and reference
point may include center frequency of carrier, synchronization
signal, synchronization signal raster, etc.)
Configuration information 3: Numerology of bandwidth part
(e.g., subcarrier spacing, CP length, etc.)
Others In addition to the pieces of configuration information of Table 1, various parameters related to the bandwidth part may be configured for the UE. The pieces of configuration information may be transmitted from the base station to the UE through higher layer signaling, for example, RRC signaling. At least one of the configured one or more bandwidth parts may be activated. Whether to activate the configured bandwidth part may be semi-statically transmitted from the base station to the UE through RRC signaling, or may be dynamically transmitted from the base station to the UE through a medium access control control element (MAC CE) or DCI.

The configuring of the bandwidth part supported by the 5G communication system may be used for various purposes.

For example, when the bandwidth supported by the UE is less than the system bandwidth, communication of the UE may be supported through bandwidth part configuration. For example, in Table 1, the frequency position of the bandwidth part (configuration information 1) is configured for the UE in order to allow the UE to transmit and receive data at a specific frequency position within the system bandwidth.

As another example, the base station may configure a plurality of bandwidth parts for the UE in order to support different numerologies from each other. For example, in order to support both data transmission and reception by using subcarrier spacing of 15 kHz and subcarrier spacing of 30 kHz with respect to a certain UE, the base station may configure the UE to use the subcarrier spacing of 15 kHz and the subcarrier spacing of 30 kHz for two bandwidth parts, respectively. Different bandwidth parts may be frequency-division-multiplexed (FDMed). When the UE attempts to transmit and receive data at specific subcarrier spacing, the bandwidth part configured with the subcarrier spacing may be activated.

As another example, in order to reduce power consumption of the UE, the base station may configure bandwidth parts having different bandwidths for the UE. For example, when the UE supports a very great bandwidth, for example, a bandwidth of 100 MHz and always transmits and receives data at the corresponding bandwidth, very high power consumption may be caused. In particular, it may be very inefficient in terms of power consumption for the UE to monitor an unnecessary DL control channel with respect to a great bandwidth of 100 MHz in a situation in which there is no traffic. Therefore, in order to reduce power consumption of the UE, the base station may configure a relatively small bandwidth part, for example, a bandwidth part of 20 MHz, for the UE. In a situation in which there is no traffic, the UE may perform a monitoring operation in the bandwidth part of 20 MHz, and when data is generated, the UE may transmit and receive data by using the bandwidth part of 100 MHz according to the indication of the base station.

Figure 6:
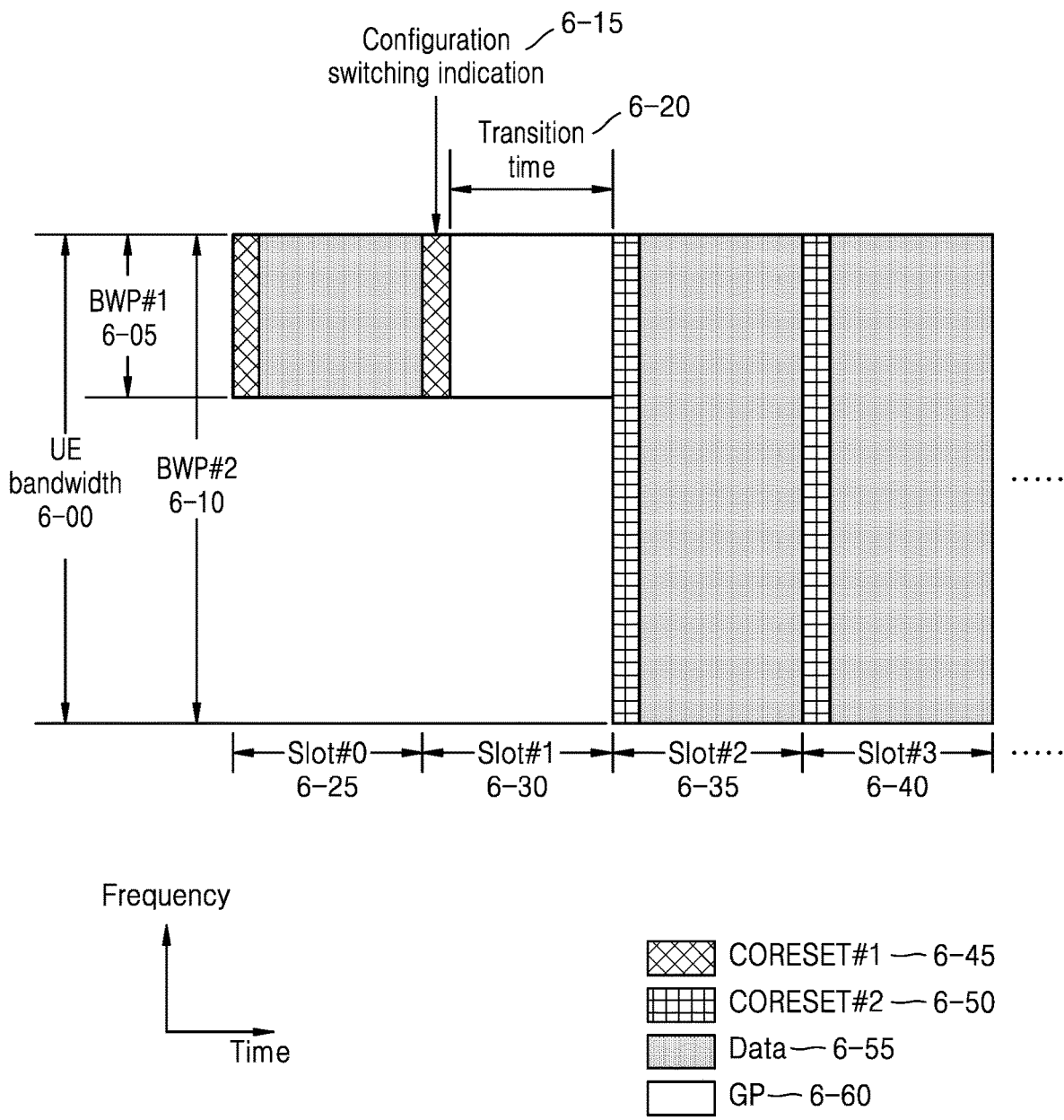
FIG. 6 is a diagram illustrating a method of indicating and changing a bandwidth part, according to an embodiment of the present disclosure.

FIG. 6 is a diagram illustrating a method of indicating and changing a dynamic configuration of a bandwidth part, according to an embodiment of the present disclosure.

As in the description of Table 1 above, the base station may configure one or more bandwidth parts for the UE, and the base station may notify the UE of information relating to the bandwidth of the bandwidth part, the frequency position of the bandwidth part, the numerology of the bandwidth part, etc. as the configuration of each bandwidth part. Referring to FIG. 6, two bandwidth parts, i.e., bandwidth part #1 (BPW #1) 6-05 and bandwidth part #2 (BWP #2) 6-10, may be configured for one UE in a UE bandwidth 6-00. One or more bandwidth parts in the configured bandwidth may be activated, and FIG. 6 illustrates an example in which one bandwidth part is activated. In FIG. 6, bandwidth part #1 6-02 among the bandwidth parts configured in slot #0 6-25 is in an activated state, and the UE may monitor a physical downlink control channel (PDCCH) in CORESET #1 6-45 configured in bandwidth part #1 6-05 and may transmit and receive data 6-55 in bandwidth part #1 6-05. The CORESET in which the UE receives the PDCCH may be changed according to which bandwidth part is activated among the configured bandwidth parts. Accordingly, the bandwidth at which the UE monitors the PDCCH may be changed.

The base station may additionally transmit, to the UE, an indicator for changing the configuration of the bandwidth part. Changing the configuration of the bandwidth part may be regarded as an operation of activating a specific bandwidth part (e.g., changing activation from bandwidth part A to bandwidth part B). The base station may transmit a configuration switching indicator to the UE in a specific slot. After receiving the configuration switching indicator from the base station, the UE may determine a bandwidth part to be activated by applying the changed configuration according to the configuration switching indicator from a specific time point, and may monitor the PDCCH in the CORESET configured in the activated bandwidth part.

In FIG. 6, the base station may transmit, to the UE, a configuration switching indicator 6-15 for indicating the change of the activated bandwidth part from existing bandwidth part #1 6-05 to bandwidth part #2 6-10 in slot #1 6-30. After receiving the corresponding indicator, the UE may activate bandwidth part #2 6-10 according to the contents of the indicator. In this case, a transition time 6-20 for the change of the bandwidth part may be required. Accordingly, a time point at which the bandwidth part to be activated is changed and applied may be determined. FIG. 6 illustrates a case in which the transition time 6-20 of one slot is required after the configuration switching indicator 6-15 is received. In the transition time 6-20, data transmission and reception may not be performed (6-60). Therefore, bandwidth part #2 6-10 may be activated in slot #2 6-35, and an operation of transmitting and receiving a control channel and data through the corresponding bandwidth part may be performed.

The base station may preconfigure one or more bandwidth parts for the UE through higher layer signaling (e.g., RRC signaling), and the configuration switching indicator 6-15 may indicate activation by a method of mapping to one of the bandwidth part configurations preconfigured by the base station. For example, a log 2N-bit indicator may select and indicate one of N preconfigured bandwidth parts. Table 2 below shows an example of indicating configuration information relating to the bandwidth part by using a 2-bit indicator.

TABLE 2

| Indicator value | Bandwidth part configuration |
|---|---|
| 00: | Bandwidth part configuration A configured through higher layer signaling |
| 01: | Bandwidth part configuration B configured through higher layer signaling |
| 10: | Bandwidth part configuration C configured through upper layer signaling |
| 11: | Bandwidth part configuration D configured through higher layer signaling |

The configuration switching indicator 6-15 for the bandwidth part described above may be transmitted to the UE in the form of MAC CE signaling or L1 signaling (e.g., common DCI, group-common DCI, UE-specific DCI, etc.).

From which time point the activation of the bandwidth part is applied according to the configuration switching indicator 6-15 for the bandwidth part described above may be determined as follows. From which time point the configuration change is applied may depend on a predefined value (e.g., applied from N (≥1) slots after receiving the configuration switching indicator), may be configured by the base station to the UE through higher layer signaling (e.g., RRC signaling), or may be transmitted by being partially included in the contents of the configuration switching indicator 6-15. Alternatively, it may be determined by a combination of the above-described methods. After receiving the configuration switching indicator 6-15 for the bandwidth part, the UE may apply the changed configuration from the time point obtained by the method.

The NR system may provide the following detailed frequency domain resource allocation (FD-RA) in addition to the frequency domain resource candidate allocation through the BWP indication.

Figure 7:
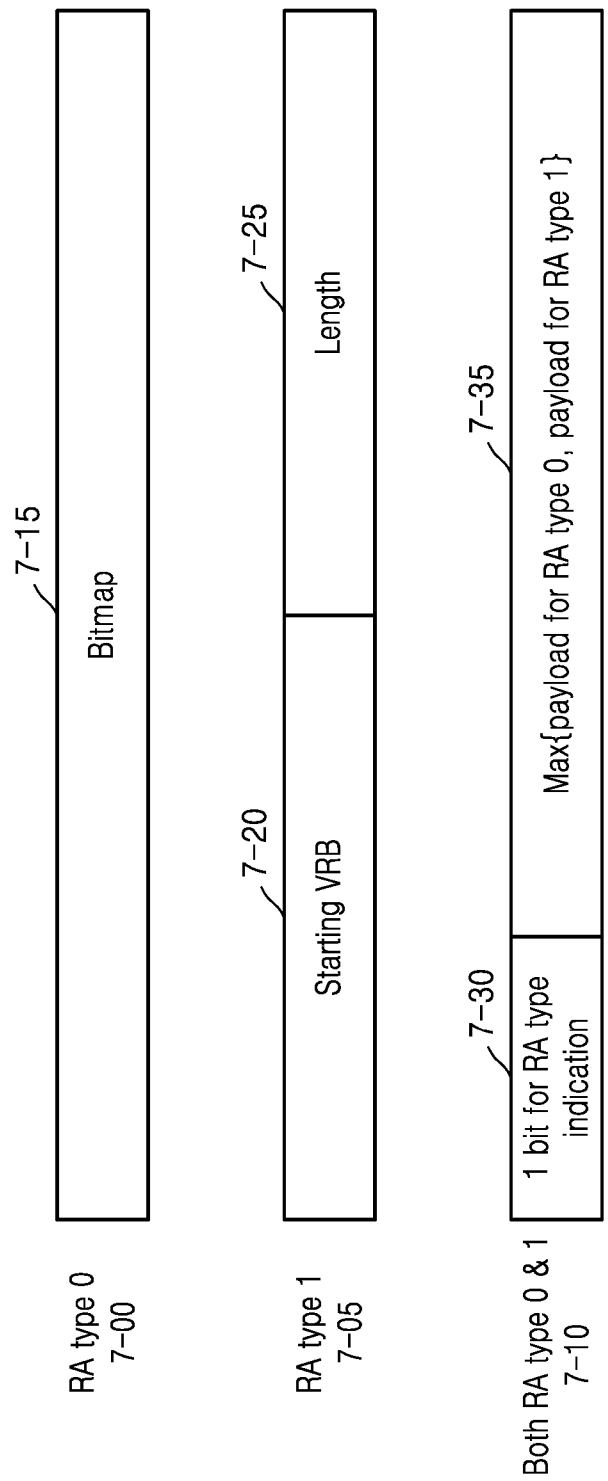
FIG. 7 is a diagram illustrating an example of physical downlink shared channel (PDSCH) frequency domain resource allocation, according to an embodiment of the present disclosure.

FIG. 7 is a diagram illustrating an example of physical downlink shared channel (PDSCH) or physical uplink shared channel (PUSCH) frequency domain resource allocation, according to an embodiment of the present disclosure.

FIG. 7 illustrates three frequency domain resource allocation methods: type 0 7-00, type 1 7-05, and dynamic switch 7-10, which are configurable through a higher layer in the NR.

When the UE is configured to use only resource type 0 through higher layer signaling (7-00), partial DCI for allocating the PDSCH or the PUSCH to the UE has a bitmap including $N_{RBG}$ bits. The conditions for this will be described again below. At this time, $N_{RBG}$ refers to the number of resource block groups (RBGs) determined as shown in Table 3 below according to a BWP size and a higher layer parameter rbg-Size allocated by the BWP indicator, and data is transmitted to the RBG that the bitmap indicates by 1.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher layer signaling (7-05), partial DCI for allocating the PDSCH or the PUSCH to the UE may have frequency domain resource allocation information including $\lceil \log_2 (N_{RB}^{DL,BWP}(N_{RB}^{DL,BWP}+1)/2) \rceil$ bits. The conditions for this will be described again below. In this manner, the base station may set a starting virtual resource block (VRB) 7-20 and a length 7-25 of frequency domain resources consecutively allocated therefrom.

When the UE is configured to use both resource type 0 and resource type 1 through higher layer signaling (7-10), partial DCI for allocating the PDSCH or the PUSCH to the UE may have frequency domain resource allocation information including bits of a larger value 7-35 among a payload 7-15 for setting resource type 0 and payloads 7-20 and 7-25 for setting resource type 1. The conditions for this will be described again below. At this time, one bit is added to a most significant bit (MSB) of the frequency domain resource allocation information in the DCI. When the corresponding bit is 0, it may indicate that resource type 0 is used, and when the corresponding bit is 1, it may indicate that resource type 1 is used.

Figure 8:
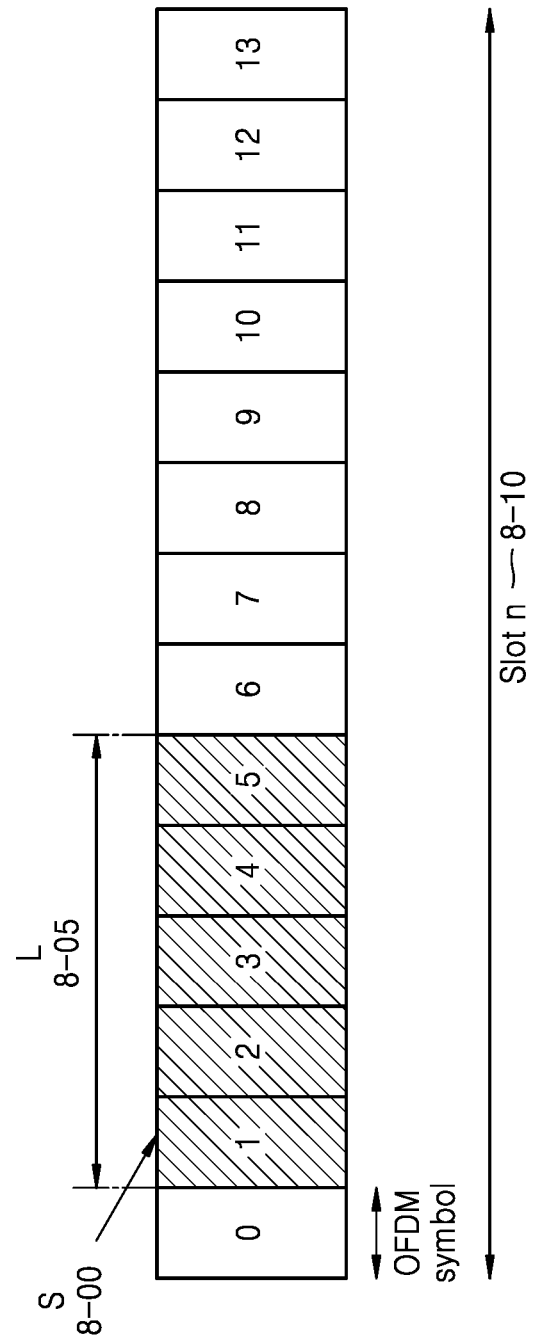
FIG. 8 is a diagram illustrating an example of PDSCH time domain resource allocation, according to an embodiment of the present disclosure.

FIG. 8 is a diagram illustrating an example of PDSCH or PUSCH time domain resource allocation, according to an embodiment of the present disclosure. Referring to FIG. 8, the base station may indicate the time domain position of the PDSCH resource based on at least one of subcarrier spacing of a data channel and a control channel configured through higher layer signaling, a scheduling offset ($K_0$ or $K_2$) value, and an OFDM symbol start position 8-00 and a length 8-05 in one slot dynamically indicated through DCI.

In the NR, various types of DCI formats may be provided according to the purpose for the efficient control channel reception of the UE as shown in Table 4 below.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0 or DCI format 1_1 to allocate (schedule) the PDSCH to one cell.

When DCI format 1_0 is transmitted together with a cyclic redundancy check (CRC) scrambled by at least one of cell radio network temporary identifier (C-RNTI), configured scheduling RNTI (CS-RNTI), or modulation coding scheme cell RNTI (MCS-C-RNTI), DCI format 1_0 includes at least the following information:

Identifier for DCI formats (1 bits) is a DCI format indicator and is always set to 1.
Frequency domain resource assignment ($\lceil \log_2 (N_{RB}^{DL,BWP}(N_{RB}^{DL,BWP}+1)/2) \rceil$ bits) indicates frequency domain resource allocation, wherein, in a case in which DCI format 1_0 is monitored in the UE specific search space, $N_{RB}$DL,BWP is the size of the active DL BWP, and in other cases, $N_{RB}$DL,BWP is the size of the initial DL BWP. A detailed method may be described with reference to the aforementioned frequency domain resource allocation method.
Time domain resource assignment (4 bits): indicates time domain resource allocation according to the above description.
VRB-to-PRB mapping (1 bit): indicates non-interleaved when 0, and indicates interleaved VRP-to-PRB mapping when 1.
Modulation and coding scheme (5 bits): indicates a modulation order and a coding rate used for PDSCH transmission.
New data indicator (1 bit): indicates whether a PDSCH corresponds to initial transmission or retransmission according to whether the indicator is toggled.
Redundancy version (2 bits): indicates a redundancy version used for PDSCH transmission.
HARQ process number (4 bits): indicates an HARQ process number used for PDSCH transmission.
Downlink assignment index (2 bits): a DAI indicator.
TPC command for scheduled PUCCH (2 bits): a PUCCH power control indicator.
PUCCH resource indicator (3 bits): is a PUCCH resource indicator and indicates one of eight types of resources according to the higher layer configuration.
PDSCH-to-HARQ feedback timing indicator (3 bits): is a hybrid automatic repeat request (HARQ) feedback timing indicator and indicates one of eight types of feedback timing offsets according to the higher layer configuration.

When DCI format 1_1 is transmitted together with a CRC scrambled by at least one of C-RNTI, CS-RNTI, or MCS-C-RNTI, DCI format 1-1 includes at least the following information:

Identifier for DCI formats (1 bit): is a DCI format indicator and is always set to 1.
Carrier indicator (0 or 3 bits): indicates a CC (or cell) on which a PDSCH allocated by the corresponding DCI is transmitted.
Bandwidth part indicator (0, 1, or 2 bits): indicates a BWP to which a PDSCH allocated by the corresponding DCI is transmitted.
Frequency domain resource assignment (payload is determined according to frequency domain resource assignment): indicates frequency domain resource allocation, where $N_{RB}$DL,BWP is a size of an active DL BWP. A detailed method may be described with reference to the aforementioned frequency domain resource allocation method.
Time domain resource assignment (4 bits): indicates time domain resource allocation according to the above description.
VRB-to-PRB mapping (0 or 1 bit): indicates non-interleaved when 0, and indicates interleaved VRP-to-PRB mapping when 1. VRB-to-PRB mapping is 0 bit when frequency domain resource allocation is set to resource type 0.
PRB bundling size indicator (0 or 1 bit): is 0 bits when the higher layer parameter prb-BundlingType is not set or is set to 'static', and 1 bit when set to 'dynamic'.
Rate matching indicator (0, 1, or 2 bits): indicates a rate matching pattern.
ZP CSI-RS trigger (0, 1, or 2 bits): is an indicator for triggering aperiodic ZP CSI-RS.
For transport block 1:
  Modulation and coding scheme (5 bits): indicates a modulation order and a coding rate used for PDSCH transmission.
  New data indicator (1 bit): indicates whether a PDSCH corresponds to initial transmission or retransmission according to whether the indicator is toggled.
  Redundancy version (2 bits): indicates a redundancy version used for PDSCH transmission.
For transport block 2:
  Modulation and coding scheme (5 bits): indicates a modulation order and a coding rate used for PDSCH transmission.
  New data indicator (1 bit): indicates whether a PDSCH corresponds to initial transmission or retransmission according to whether the indicator is toggled.
  Redundancy version (2 bits): indicates a redundancy version used for PDSCH transmission.
HARQ process number (4 bits): indicates an HARQ process number used for PDSCH transmission.

Downlink assignment index (0, 2, or 4 bits): a DAI indicator.
TPC command for scheduled PUCCH (2 bits): a PUCCH power control indicator.
PUCCH resource indicator (3 bits); is a PUCCH resource indicator and indicates one of eight types of resources according to higher layer configuration.
PDSCH-to-HARQ feedback timing indicator (3 bits): is a hybrid automatic repeat request (HARQ) feedback timing indicator and indicates one of eight types of feedback timing offsets according to higher layer configuration.
Antenna port (4, 5, or 6 bits): indicates a demodulation reference signal (DMRS) port and a code division multiplex (CDM) group without data.
Transmission configuration indication (0 or 3 bits): a TCI indicator.
SRS request (2 or 3 bits): an SRS transmission request indicator.
CBG transmission information (0, 2, 4, 6, or 8 bits): an indicator indicating whether to transmit code block groups in the allocated PDSCH. 0 means that the CBG is not transmitted, and 1 means that the CBG is transmitted.
CBG flushing out information (0 or 1 bit): is an indicator indicating whether previous CBGs are contaminated, wherein 0 indicates that the previous CBGs are contaminated, and 1 indicates that the previous CBGs are combinable in retransmission reception.
DMRS sequence initialization (0 or 1 bit): a DMRS scrambling ID selection indicator.

For example, the base station may use DCI format 0_0 or DCI format 0_1 to allocate PUSCH to one cell.

When DCI format 0_0 is transmitted together with a CRC scrambled by at least one of C-RNTI, CS-RNTI, or MCS-C-RNTI, DCI format 0-0 includes at least the following information:

Identifier for DCI formats (1 bit) is a DCI format indicator and is always set to 0.
Frequency domain resource assignment (payload is determined according to frequency domain resource assignment) indicates frequency domain resource allocation, where $N_{RB}^{DL,BWP}$ is the size of the active DL BWP. A detailed method may be described with reference to the aforementioned frequency domain resource allocation method.
Time domain resource assignment (4 bits): indicates time domain resource allocation according to the above description.
Frequency hopping flag (0 or 1 bit): indicates whether frequency domain hopping is enabled for a PUSCH allocated by the corresponding DCI.
Modulation and coding scheme (5 bits): indicates a modulation order and a coding rate used for PUSCH transmission.
New data indicator (1 bit): indicates whether a PUSCH corresponds to initial transmission or retransmission according to whether the indicator is toggled.
Redundancy version (2 bits): indicates a redundancy version used for PUSCH transmission.
HARQ process number (4 bits): indicates an HARQ process number used for PUSCH transmission.
TPC command for scheduled PUSCH (2 bits): an indicator for adjusting the transmission power strength of a PUSCH allocated by the corresponding DCI.
UL-SCH indicator (1 bit) indicates whether UL-SCH is included in a PUSCH allocated by the corresponding DCI.

When DCI format 0_1 is transmitted together with a CRC scrambled by at least one of C-RNTI, CS-RNTI, semi-persistent channel state information RNTI (SP-CSI-RNTI), or MCS-C-RNTI, DCI format 0_1 includes at least the following information:

Identifier for DCI formats (1 bit): is a DCI format indicator and is always set to 0.
Carrier indicator (0 or 3 bits): indicates a CC (or cell) on which a PUSCH allocated by the corresponding DCI is transmitted.
UL/SUL indicator (0 or 1 bit): indicates whether a PUSCH allocated by the corresponding DCI transmits supplementary UL (SUL).
Bandwidth part indicator (0, 1, or 2 bits): indicates a BWP to which a PUSCH allocated by the corresponding DCI is transmitted.
Frequency domain resource assignment (payload is determined according to frequency domain resource assignment): indicates frequency domain resource allocation, where $N_{RB}^{DL,BWP}$ is the size of the active DL BWP. A detailed method may be described with reference to the aforementioned frequency domain resource allocation method.
Time domain resource assignment (4 bits): indicates time domain resource allocation according to the description.
Frequency hopping flag (0 or 1 bit): indicates whether frequency domain hopping is enabled for a PUSCH allocated by the corresponding DCI.
Modulation and coding scheme (5 bits): indicates a modulation order and a coding rate used for PUSCH transmission.
New data indicator (1 bit): indicates whether a PUSCH is initial transmission or retransmission according to whether the indicator is toggled.
Redundancy version (2 bits): indicates a redundancy version used for PUSCH transmission.
HARQ process number (4 bits): indicates an HARQ process number used for PUSCH transmission.
$1^{st}$ downlink assignment index (1 or 2 bits): indicates a DAI for HARQ-ACK codebook generation.
$2^{nd}$ downlink assignment index (0 or 2 bits): indicates a DAI for HARQ-ACK codebook generation.
TPC command for scheduled PUSCH (2 bits): an indicator for adjusting the transmission power strength of a PUSCH allocated by the corresponding DCI.
SRS resource indicator (variable according to an SRS usage configuration): indicates a transmission precoding configuration of a PUSCH allocated by the corresponding DCI through an SRS resource.
Precoding information and number of layers (0, 1, 2, 3, 4, 5, or 6 bits): indicates transmission precoding information of a PUSCH allocated by the corresponding DCI and the number of transmission layers.
Antenna port (2, 3, 4, or 5 bits): indicates a transmission DMRS port of a PUSCH allocated by the corresponding DCI and a CDM group without data.
SRS request (2 or 3 bits): indicates an SRS resource requested to be transmitted through the corresponding DCI.
CSI request (0, 1, 2, 3, 4, 5, or 6 bits): indicates a CSI report trigger state requested to be transmitted through the corresponding DCI.

CBG transmission information (0, 2, 4, 6, or 8 bits): indicates whether code block groups in a PUSCH allocated by the corresponding DCI are transmitted.

Phase tracking reference signal (PTRS)-DMRS association (0 or 2 bits): indicates an association between a PTRS port and a DMRS port of a PUSCH allocated by the corresponding DCI.

Beta_offset indicator (0 or 2 bits): indicates an offset value used when an HARQ-ACK or a CSI report is multiplexed to a PUSCH.

DMRS sequence initialization (0 or 1 bit): a DMRS scrambling ID selection indicator.

UL-shared channel (SCH) indicator (0 or 1 bit): indicates whether a UL-SCH is included in a PUSCH allocated by the corresponding DCI.

The maximum number of DCIs of different sizes that the UE is able to receive per slot in the corresponding cell is 4. The maximum number of DCIs of different sizes scrambled by C-RNTI that the UE is able to receive per slot in the cell is 3.

The NR system includes a CSI framework for indicating the base station to measure and report CS) of the UE. The CSI framework of the NR may include at least two elements, that is, resource setting and report setting. The report setting may have a connection relationship with each other by referring to at least one ID of the resource setting.

According to an embodiment of the present disclosure, the resource setting may include information relating to a reference signal (RS) for the UE to measure CSI. The base station may configure at least one resource setting for the UE. As an example, the base station and the UE may exchange the following signaling information in order to transmit information relating to the resource setting.

| CSI-ResourceConfig information element |
|---|
| -- ASN1START
-- TAG-CSI-RESOURCECONFIG-START
CSI-ResourceConfig ::=         SEQUENCE {
  csi-ResourceConfigId         CSI-ResourceConfigId,
  csi-RS-ResourceSetList       CHOICE {
    nzp-CSI-RS-SSB             SEQUENCE {
      nzp-CSI-RS-ResourceSetList           SEQUENCE (SIZE (1..maxNrofNZP-CSI-RS-ResourceSetsPerConfig)) OF NZP-CSI-RS-ResourceSetId OPTIONAL, -- Need R
      csi-SSB-ResourceSetList              SEQUENCE (SIZE (1..maxNrofCSI-SSB-ResourceSetsPerConfig)) OF CSI-SSB-ResourceSetId OPTIONAL -- Need R
    },
    csi-IM-ResourceSetList     SEQUENCE (SIZE (1..maxNrofCSI-IM-ResourceSetsPerConfig)) OF CSI-IM-ResourceSet Id
  },
  bwp-Id                       BWP-Id,
  resourceType                 ENUMERATED { aperiodic, semiPersistent, periodic },
  ...
-- TAG-CSI-RESOURCECONFIG-STOP
-- ASN1STOP |

Signaling information CSI-ResourceConfig includes information relating to each resource setting. According to the signaling information CSI-ResourceConfig, each resource setting may include at least one of a resource setting index (csi-ResourceConfigId), a BWP index (bwp-ID), time domain transmission configuration of resources (resourceType), or a resource set list (csi-RS-ResourceSetList) including at least one resource set. Time domain transmission configuration of resources may be configured to be aperiodic transmission, semi-persistent transmission, or periodic transmission. The resource set list may be a set including resource sets for channel measurement, or a set including resource sets for interference measurement. When the resource set list is a set including resource sets for channel measurement, each resource set may include at least one resource, and the at least one resource may be an index of a CSI-RS resource or a synchronization/broadcast channel block (SS/PBCH block, SSB). When the resource set list is a set including resource sets for interference measurement, each resource set may include at least one interference measurement resource (CSI interference measurement, CSI-IM). For example, when the resource set includes a CSI-RS, the base station and the terminal may exchange the following signaling information in order to transmit information relating to the resource set.

| NZP-CSI-RS-ResourceSet information element |
|---|
| -- ASN1START
-- TAG-NZP-CSI-RS-RESOURCESET-START
NZP-CSI-RS-ResourceSet ::=     SEQUENCE {
  nzp-CSI-ResourceSetId        NZP-CSI-RS-ResourceSetId,
  nzp-CSI-RS-Resources         SEQUENCE (SIZE (1..maxNrofNZP-CSI-RS-ResourcesPerSet)) OF NZP-CSI-RS-ResourceId,
  repetition                   ENUMERATED { on, off } OPTIONAL, -- Need S
  aperiodicTriggeringOffset    INTEGER(0..6) OPTIONAL, -- Need S
  trs-Info                     ENUMERATED {true} OPTIONAL, -- Need R
  ...
} |

-continued

| NZP-CSI-RS-ResourceSet information element |
|---|
| -- TAG-NZP-CSI-RS-RESOURCESET-STOP
-- ASN1STOP |

The signaling information NZP-CSI-RS-Resource includes information relating to each CSI-RS. According to the signaling information NZP-CSI-RS-ResourceSet, each resource set may include at least one of information relating to at least one resource set index (nzp-CSI-ResourceSetId) or information relating to a CSI-RS index set (nzp-CSI-RS-Resources) included in each resource set. In addition, each resource set may include at least one piece among a portion of information relating to a spatial domain transmission filter of a CSI-RS resource included in each resource set (repetition) or information relating to whether a tracking purpose of a CSI-RS resource (trs-Info).

CSI-RS may be the most representative reference signal included in the resource set. The base station and the UE may exchange the following signaling information in order to transmit information relating to the CSI-RS resource.

| NZP-CSI-RS-Resource information element |
| --- |
| -- ASN1START |
| -- TAG-NZP-CSI-RS-RESOURCE-START |
| NZP-CSI-RS-Resource ::=  SEQUENCE { |
|   nzp-CSI-RS-ResourceId  Resource:: =, |
|   resourceMapping  CSI-RS-ResourceMapping, |
|   powerControlOffset  INTEGER (-8..15), |
|   powerControlOffsetSS  ENUMERATED{db-3, db0, db3, db6} |
| OPTIONAL, -- Need R |
|   scramblingID  ScramblingId, |
|   periodicityAndOffset  CSI-ResourcePeriodicityAndOffset |
| OPTIONAL, -- Cond PeriodicOrSemiPersistent |
|   qcl-InfoPeriodicCSI-RS  TCI-StateId |
| OPTIONAL, -- Cond Periodic |
|   ... |
| } |

| NZP-CSI-RS-Resource information element |
| --- |
| -- TAG-NZP-CSI-RS-RESOURCE-STOP |
| -- ASN1STOP |

The signaling information NZP-CSI-RS-Resource includes information relating to each CSI-RS. The information included in the signaling information NZP-CSI-RS-Resource may have the following meanings.

nzp-CSI-RS-ResourceId: an index of a CSI-RS resource resourceMapping: resource mapping information of a CSI-RS resource powerControlOffset: a ratio between PDSCH EPRE (Energy Per RE) and CSI-RS EPRE powerControlOffsetSS: a ratio between SS/PBCH block EPRE and CSI-RS EPRE scramblingID: a scrambling index of a CSI-RS sequence periodicityAndOffset: a transmission period and a slot offset of a CSI-RS resource qcl-InfoPeriodicCSI-RS: TCI-state information when a corresponding CSI-RS is a periodic CSI-RS resourceMapping included in the signaling information NZP-CSI-RS-Resource may indicate resource mapping information of a CSI-RS resource, and may include RE mapping for frequency resources, the number of ports, symbol mapping, CDM type, frequency resource density, and frequency band mapping information. Each of the number of ports, frequency resource density, CDM type, and time-frequency domain RE mapping, which may be configured through resourceMapping, may have a determined value in one of the rows shown in Table 5.

TABLE 5

| Row | Ports X | Density ρ | cdm-Type | $(\bar{k}, \bar{l})$ | CDM group index j | k' | l' |
| --- | --- | --- | --- | --- | --- | --- | --- |
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1), (k_0, l_1), (k_1, l_1), (k_2, l_1), (k_3, l_1), (k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Table 5 shows a frequency resource density configurable according to the number (X) of CSI-RS ports, a CDM type, frequency and time domain starting positions (($\bar{k}$,$\bar{l}$)) of a CSI-RS component RE pattern, and the number (k') of frequency domain REs and the number (l') of time domain REs of a CSI-RS component RE pattern. The CSI-RS component RE pattern may be a basic unit configuring a CSI-RS resource. The CSI-RS component RE pattern may be configured by YZ REs through Y=1+max(k') frequency domain REs and Z=1+max(l') time domain REs. When the number of CSI-RS ports is 1, a position of a CSI-RS RE may be designated in a PRB without restriction on subcarriers, and may be designated by a bitmap having 12 bits. When the number of CSI-RS ports is {2, 4, 8, 12, 16, 24, 32} and Y is equal to 2, a position of a CSI-RS RE may be designated at every two subcarriers in a PRB, and may be designated by a bitmap having 6 bits. When the number of CSI-RS ports is 4 and Y is equal to 4, a position of a CSI-RS RE may be designated at every four subcarriers in a PRB, and may be designated by a bitmap having 3 bits. Similarly, a position of a time domain RE may be designated by a bitmap having a total of 14 bits. In this case, according to a Z value shown in Table 5, the length of the bitmap may be changed like a frequency position designation. However, the principle thereof is similar to the above description, and therefore, a redundant description thereof will be omitted hereinafter.

According to an embodiment of the present disclosure, the report setting may have a connection relationship with each other by referring to at least one ID of the resource setting. The resource setting(s) having a connection relationship with the report setting may provide configuration information including information relating to the reference signal for measuring channel information. When the resource setting(s) having a connection relationship with the report setting is used for measuring channel information, the measured channel information may be used for reporting channel information according to a reporting method configured in the report setting having the connection relationship.

According to an embodiment of the present disclosure, the report setting may include configuration information relating to the CSI reporting method. As an example, the base station and the UE may exchange the following signaling information in order to transmit information relating to the report setting.

| CSI-ReportConfig Information element |
|---|
| -- ASN1START |
| -- TAG-CSI-REPORTCONFIG-START |
| CSI-ReportConfig ::=                SEQUENCE { |
|     reportConfigId               CSI-ReportConfigId, |
|     carrier                      ServCellIndex                          OPTIONAL, -- Need S |
|     resourcesForChannelMeasurement           CSI-ResourceConfigId, |
|     csi-IM-ResourcesForInterference          CSI-ResourceConfigId              OPTIONAL, -- Need R |
|     nzp-CSI-RS-ResourcesForInterference      CSI-ResourceConfigId              OPTIONAL, -- Need R |
|     reportConfigType             CHOICE { |
|       periodic                  SEQUENCE { |
|         reportSlotConfig          CSI-ReportPeriodicityAndOffset, |
|         pucch-CSI-ResourceList    SEQUENCE (SIZE (1..maxNrofBWPs)) OF PUCCH-CSI-Resource |
|       }, |
|       semiPersistentOnPUCCH     SEQUENCE { |
|         reportSlotConfig          CSI-ReportPeriodicityAndOffset, |
|         pucch-CSI-ResourceList    SEQUENCE (SIZE (1..maxNrofBWPs)) OF PUCCH-CSI-Resource |
|       }, |
|       semiPersistentOnPUSCH     SEQUENCE { |
|         reportSlotConfig          ENUMERATED {sl5, sl10, sl20, sl40, sl80, sl160, sl320}, |
|         reportSlotOffsetList      SEQUENCE (SIZE (1.. maxNrofUL-Allocations)) OF INTEGER(0..32), |
|         p0alpha                   P0-PUSCH-AlphaSetId |
|       }, |
|       aperiodic                 SEQUENCE { |
|         reportSlotOffsetList      SEQUENCE (SIZE (1..maxNrofUL-Allocations)) OF INTEGER(0..32) |
|       } |
|     }, |
|     reportQuantity               CHOICE { |
|       none                      NULL, |
|       cri-RI-PMI-CQI            NULL, |
|       cri-RI-i1                 NULL, |
|       cri-RI-i1-CQI             SEQUENCE { |
|         pdsch-BundleSizeForCSI    ENUMERATED {n2, n4}             OPTIONAL -- Need S |
|       }, |
|       cri-RI-CQI                NULL, |
|       cri-RSRP                  NULL, |
|       ssb-Index-RSRP            NULL, |
|       cri-RI-LI-PMI-CQI         NULL |
|     }, |

-continued

| CSI-ReportConfig Information element |
|---|

```
                reportFreqConfiguration      SEQUENCE {
                  cqi-FormatIndicator              ENUMERATED { widebandCQI,
subbandCQI }        OPTIONAL,      -- Need R
                  pmi-FormatIndicator              ENUMERATED { widebandPMI,
subbandPMI }        OPTIONAL,      -- Need R
                  csi-ReportingBand                CHOICE {
                    subbands3                      BIT STRING(SIZE(3)),
                    subbands4                      BIT STRING(SIZE(4)),
                    subbands5                      BIT STRING(SIZE(5)),
                    subbands6                      BIT STRING(SIZE(6)),
                    subbands7                      BIT STRING(SIZE(7)),
                    subbands8                      BIT STRING(SIZE(8)),
                    subbands9                      BIT STRING(SIZE(9)),
                    subbands10                      BIT STRING(SIZE(10)),
                    subbands11                      BIT STRING(SIZE(11)),
                    subbands12                      BIT STRING(SIZE(12)),
                    subbands13                      BIT STRING(SIZE(13)),
                    subbands14                      BIT STRING(SIZE(14)),
                    subbands15                      BIT STRING(SIZE(15)),
                    subbands16                      BIT STRING(SIZE(16)),
                    subbands17                      BIT STRING(SIZE(17)),
                    subbands18                      BIT STRING(SIZE(18)),
                    ...,
                    subbands19-v1530                    BIT STRING(SIZE(19))
                  } OPTIONAL    -- Need S
                }                                                 OPTIONAL,
-- Need R
                  timeRestrictionForChannelMeasurements             ENUMERATED
{configured, notConfigured},
                  timeRestrictionForInterferenceMeasurements        ENUMERATED
{configured, notConfigured},
                  codebookConfig                   CodebookConfig
OPTIONAL,        -- Need R
                  dummy                            ENUMERATED {n1, n2}
OPTIONAL,        -- Need R
                  groupBasedBeamReporting          CHOICE {
                    enabled                        NULL,
                    disabled                       SEQUENCE {
                      nrofReportedRS               ENUMERATED {n1, n2, n3, n4}
OPTIONAL        -- Need S
                    }
                  },
                  cqi-Table      ENUMERATED {table1, table2, table3, spare1}
OPTIONAL,        -- Need R     ENUMERATED {value1, value2},
                  subbandSize
                  non-PMI-PortIndication   SEQUENCE (SIZE (1..maxNrofNZP-CSI-
RS-ResourcesPerConfig)) OF PortIndexFor8Ranks OPTIONAL,   -- Need R
                  ...,
                  [[
                  semiPersistentOnPUSCH-v1530      SEQUENCE {
                    reportSlotConfig-v1530         ENUMERATED {sl4, sl8, sl16}
                  }                                                 OPTIONAL
-- Need R
                  ]]
                }
```

The signaling information CSI-ReportConfig includes information relating to each report setting. The information included in the signaling information CSI-ReportConfig may have the following meanings.

reportConfigId: report setting index carrier: serving cell index resourcesForChannelMeasurement: resource setting index for channel measurement having connection relationship with report setting csi-IM-ResourcesForInterference: resource setting index having CSI-IM resource for interference measurement having connection relationship with report setting nzp-CSI-RS-ResourcesForInterference: resource setting index having CSI-RS resource for interference measurement having connection relationship with report setting reportConfigType: indicates a time domain transmission configuration and a transmission channel of a channel report, and may have aperiodic transmission, semi-persistent physical uplink control channel (PUCCH) transmission, semi-periodic PUSCH transmission, or periodic transmission configuration.

reportQuantity: indicates a type of channel information to be reported, and may have types of channel information ('cri-RI-PMI-CQI', 'cri-RSRP', 'ssb-Index-RSRP', and 'cri-RI-LI-PMI-CQI') when not transmitting channel report ('none') and when transmitting channel report. Elements included in the type of the channel information refer to channel quality indicator (CQI), precoding matric indicator (PMI), CSI-RS resource indicator (CRI), SS/PBCH block resource indicator (SSBRI), layer indicator (LI), rank indicator (RI), and/or L1-reference signal received power (RSRP).

reportFreqConfiguration: indicates whether channel information to be reported includes only information about the wideband or information relating to each subband, and may have configuration information relating to the subband including the channel information when information relating to each subband is included.

timeRestrictionForChannelMeasurements: the presence or absence of time domain restriction for reference signal for channel measurement among reference signals referenced by channel information to be reported.

timeRestrictionForInterferenceMeasurements: the presence or absence of time domain restriction for reference signal for interference measurement among reference signals referenced by channel information to be reported.

codebookConfig: codebook information referenced by channel information to be reported groupBasedBeamReporting: presence or absence of beam grouping in channel report cqi-Table: CQI table index referenced by channel information to be reported subbandSize: index indicating the subband size of channel information non-PMI-PortIndication: port mapping information referenced when reporting non-PMI channel information When the base station indicates the channel information report through higher layer signaling or L1 signaling, the UE may perform the channel information report with reference to the above-described configuration information included in the indicated report setting.

The base station may indicate a CSI report to the UE through higher layer signaling including RRC signaling or MAC CE signaling, or L1 signaling (e.g., common DCI, group-common DCI, UE-specific DCI).

For example, the base station may indicate an aperiodic channel information report (CSI report) to the UE through higher layer signaling or DCI using DCI format 0_1. The base station may set a parameter for the aperiodic CSI report of the UE or a plurality of CSI report trigger states including a parameter for the CSI report through higher layer signaling. The parameter for the CSI report or the CSI report trigger state may include types of channel information including PDCCH including DCI, PUCCH including CSI report, slot interval between PUSCHs, aggregation including possible slot interval, reference signal ID for channel state measurement, etc. When the base station indicates some of CSI report trigger states the UE through DCI, the UE may report channel information according to CSI report configuration of the report setting configured in the indicated CSI report trigger state. The time domain resource allocation of PUCCH or PUSCH including the CSI report of the UE may be indicated through at least one of slot interval with a PDCCH indicated through DCI, a start symbol and a symbol length indication within a slot for time domain resource allocation of PUSCH, or a PUCCH resource indication. For example, the base station may indicate the position of the slot, in which the PUSCH including the CSI report of the UE is transmitted, through the slot interval with the PDCCH indicated through DCI, and the start symbol and the symbol length in the slot may be indicated through the time domain resource assignment field of the DCI described above.

For example, the base station may indicate a semi-persistent CSI report to the UE through higher layer signaling or DCI using DCI format 0_1. The base station may activate or deactivate the semi-persistent CSI report through higher layer signaling including MAC CE signaling or DCI scrambled by SP-CSI-RNTI. When the semi-persistent CSI report is activated, the UE may periodically report channel information according to the configured slot interval. When the semi-persistent CSI report is deactivated, the UE may stop the activated periodic channel information report. The base station sets a parameter for the semi-persistent CSI report of the UE or a plurality of CSI report trigger states including a parameter for semi-persistent CSI report through higher layer signaling. The parameter for the CSI report or the CSI report trigger states may include the slot interval between the PDCCH including the DCI indicating the CSI report and the PUCCH or PUSCH including the CSI report, the aggregation including possible slot intervals, the slot interval between the slot in which higher layer signaling indicating the CSI report is activated and the PUCCH or PUSCH including the CSI report, the slot interval period of the CSI report, and the type of the included channel information. When the base station activates some CSI report trigger states or some report settings to the UE through higher layer signaling or DCI, the UE may report channel information according to the report setting included in the indicated CSI report trigger state or the CSI report setting configured in the activated report setting. The time domain resource allocation of the PUCCH or PUSCH including the CSI report of the UE may be indicated through at least one of the slot interval period of the CSI report, the slot interval with the slot in which higher layer signaling is activated or the slot interval with the PDCCH indicated through DCI, the start symbol and the symbol length indication in the slot for time domain resource allocation of the PUSCH, or the PUCCH resource indication. For example, the base station may indicate the position of the slot, in which the PUSCH including the CSI report of the UE is transmitted, through the slot interval with the PDCCH indicated through DCI, and the start symbol and the symbol length in the slot may be indicated through the time domain resource assignment field of DCI format 0_1 described above. For example, the base station may indicate the position of the slot, in which the PUCCH including the CSI report of the UE is transmitted, through the slot interval period of the CSI report configured through higher layer signaling and the slot interval between the slot in which higher layer signaling is activated and the PUCCH including the CSI report, and the start symbol and the symbol length in the slot may be indicated through the start symbol and the symbol length to which the PUCCH resource configured through higher layer signaling is allocated.

For example, the base station may indicate the periodic CSI report to the UE through higher layer signaling. The base station may activate or deactivate the periodic CSI report through higher layer signaling including RRC signaling. When the periodic CSI report is activated, the UE may periodically report channel information according to the configured slot interval. When the periodic CSI report is deactivated, the UE may stop the activated periodic channel information report. The base station may configure the report setting including the parameters for the periodic CSI report of the UE through higher layer signaling. The parameter for the CSI report may include the slot interval between the slot in which higher layer signaling indicating the CSI report is activated and the PUCCH or PUSCH including the CSI report, the slot interval period of the CSI report, the reference signal ID for channel state measurement, the type of the included channel information, and the like. The time domain resource allocation of the PUCCH or PUSCH including the CSI report of the UE may be indicated through at least one of the slot interval period of the CSI report, the slot interval with the slot in which higher layer signaling is activated or the slot interval with the PDCCH indicated through DCI, the start symbol and the symbol length indication in the slot for time domain resource allocation of the PUSCH, or the PUCCH resource indication. For example, the base station may indicate the position of the slot, in which the PUCCH including the CSI report of the UE is transmitted, through the slot interval period of the CSI report configured through higher layer signaling and the slot interval between the slot in which higher layer signaling is activated and the PUCCH including the CSI report, and the start symbol and the symbol length in the slot may be indicated through the start symbol and the symbol length to which the PUCCH resource configured through higher layer signaling is allocated.

When the base station indicates the aperiodic CSI report or the semi-persistent CSI report to the UE through DCI, the base station and the UE may determine whether the UE is able to perform valid channel reporting through the indicated CSI report, considering a CSI computation time required for the CSI report. For the aperiodic CSI report or the semi-persistent CSI report indicated through DCI, the UE may perform valid CSI reporting from a UL symbol after Z symbols from the end of the last symbol included in the PDCCH including the DCI indicating the CSI report. The above-described Z symbols may be changed according to the numerology of the DL bandwidth part corresponding to the PDCCH including the DCI indicating the CSI report, the numerology of the UL bandwidth part corresponding to the PUSCH transmitting the CSI report, the types or characteristics of channel information reported in the CSI report (report quantity, frequency band granularity, the number of ports of the reference signal, the codebook type, etc.). Also, when the reference signal for channel measurement for the aperiodic CSI report indicated to the UE through DCI is an aperiodic reference signal, the UE may perform valid CSI reporting from a UL symbol after Z' symbols from the end of the last symbol including the reference signal. The above-described Z' symbols may be changed according to the numerology of the DL bandwidth part corresponding to the PDCCH including the DCI indicating the CSI report, the numerology of the bandwidth corresponding to the reference signal for channel measurement for the CSI report, the numerology of the UL bandwidth part corresponding to the PUSCH transmitting the CSI report, and the types or characteristics of channel information reported in the CSI report (report quantity, frequency band granularity, the number of ports of the reference signal, the codebook type, etc.). For example, when the base station indicates the aperiodic CSI report for the aperiodic reference signal to the UE through DCI, the UE may perform valid CSI reporting from the first UL symbol satisfying both the time point after Z symbols from the end of the last symbol included in the PDCCH including the DCI indicating the CSI report and the time point after Z' symbols from the end of the last symbol including the reference signal. When the CSI report time point indicated by the base station does not satisfy the CSI computation time requirement, the UE may not consider the channel information state update for the valid CSI report.

The Z and Z' symbols for the CSI computation time calculation may follow Table 6 and Table 7 below. For example, the Z and Z' symbols may follow the $Z_1$, $Z_1'$ values in Table 6 when the channel information to be reported in the CSI report includes only wideband information, the number of ports of the reference signal is 4 or less, the reference signal resource is one, the codebook type is 'typeI-SinglePanel', or the type of channel information to be reported (report quantity) is 'cri-RI-CQI'. This may be understood as delay requirement 1. In addition, the Z and Z' symbols may follow the $Z_1$, $Z_1'$ values in Table 7 when the PUSCH including the CSI report does not include TB or HARQ-ACK and the CPU occupation of the UE is 0. This may be understood as delay requirement 2. The CPU occupation is described below. In addition, the Z and Z' symbols may follow the $Z_3$, $Z_3'$ values in Table 7 when the report quantity is cri-RSRP' or ssb-Index-RSRP'. In Table 7, $X_1$, $X_2$, $X_3$, $X_4$ refers to the UE capability for the beam report time, and $KB_1$ and $KB_2$ in Table 7 refer to the UE capability for the beam change time. The Z and Z' symbols may follow the $Z_2$, $Z_2'$ values in Table 7 when the channel information to be reported by the CSI report does not correspond to the conditions corresponding to delay requirement 1 or delay requirement 2 described above.

TABLE 6

| | $Z_1$[symbols] | |
|---|---|---|
| μ | $Z_1$ | $Z_1'$ |
| 0 | 10 | 8 |
| 1 | 13 | 11 |
| 2 | 25 | 21 |
| 3 | 43 | 36 |

TABLE 7

| | $Z_1$ [symbols] | | $Z_2$ [symbols] | | $Z_3$ [symbols] | |
|---|---|---|---|---|---|---|
| μ | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When the base station indicates the aperiodic/semi-persistent/periodic CSI report to the UE, the base station may set the CSI reference resource in units of slots in order to determine the reference time of the reference signal for measuring channel information to be reported in the CSI report. For example, when the base station indicates to transmit CSI report #X in UL slot n', the CSI reference resource of CSI report #X to be transmitted at the UL slot n' may be defined as DL slot n−$n_{CSA\text{-}ref}$. DL slot n may be calculated as n=$\lfloor n' \cdot 2^{\mu DL}/2^{\mu UL} \rfloor$ by considering the UL and DL numerologies μDL, μUL. In a case in which CSI report #X to be transmitted at UL slot n' is the semi-persistent or periodic CSI report, $n_{CSI\text{-}ref}$, which is the slot interval between the DL slot n and the CSI reference resource may follow $n_{CSI\text{-}ref}$=4·$23^{\mu DL}$ when a single CSI-RS resource is connected to the CSI report, and may follow $n_{CSI\text{-}ref}$=5·$2^{\mu DL}$ when multiple CSI-RS resources are connected to the CSI report, according to the number of CSI-RS resources for channel measurement. When the CSI report #X to be transmitted at UL slot n' is the aperiodic CSI report, $n_{CSI\text{-}ref}$=$\lceil Z'/N_{symb}^{slot} \rceil$ may be calculated by considering the CSI computation time Z' for channel measurement. $N_{symb}^{slot}$ described above is the number of symbols included in one slot, and the NR assumes that $N_{symb}^{slot}$=14.

When the base station indicates the UE to transmit a certain CSI report in UL slot n' through higher layer signaling or DCI, the UE may report the CSI by performing channel measurement or interference measurement on a CSI-RS resource, a CSI-IM resource, or an SSB resource transmitted no later than the CSI reference resource slot of the CSI report to be transmitted at UL slot n' among CSI-RS resources, CSI-IM resources, or SSB resources associated with the CSI report. The CSI-RS resource, the CSI-IM resource, or the SSB resource associated with the CSI report may refer to i) a CSI-RS resource, a CSI-IM resource, or a SSB resource included in the resource set configured in the resource setting referenced by the report setting for the CSI report of the UE configured through higher layer signaling, ii) a CSI-RS resource, a CSI-IM resource, or an SSB resource referenced by the CSI report trigger state including the parameter for the CSI report, or iii) a CSI-RS resource, a CSI-IM resource, or an SSB resource indicated by the ID of the RS set.

In embodiments of the present disclosure, the CSI-RS/CSI-IM/SSB occasion may refer to a transmission time point of CSI-RS/CSI-IM/SSB resource(s) determined by higher layer configuration or a combination of higher layer configuration and DCI triggering. As one example, in the semi-persistent or periodic CSI-RS resource, the slot to be transmitted may be determined according to the slot period and the slot offset configured by higher layer signaling, and intra-slot transmission symbol(s) may be determined with reference to one of the intra-slot resource mapping methods of Table 5 according to resource mapping information (resourceMapping). As another example, in the aperiodic CSI-RS resource, the slot to be transmitted may be determined according to the slot offset with the PDCCH including the DCI indicating the channel report configured by higher layer signaling, and intra-slot transmission symbol(s) may be determined with reference to one of the intra-slot resource mapping methods of Table 5 according to resource mapping information (resourceMapping).

The CSI-RS occasion described above may be determined by independently considering the transmission time of each CSI-RS resource or comprehensively considering the transmission time of one or more CSI-RS resource(s) included in the resource set. Accordingly, the following two interpretations are possible for the CSI-RS occasion according to each resource set configuration.

Interpretation 1-1: From the start time point of the earliest symbol to the end time point of the latest symbol, at which one specific resource is transmitted among one or more CSI-RS resources included in the resource set(s) configured in the resource setting referenced by the report setting configured for the CSI report.

Interpretation 1-2: From the start time point of the earliest symbol at which the CSI-RS resource transmitted at the earliest time point is transmitted to the end time of the latest symbol at which the CSI-RS resource transmitted at the latest time point is transmitted, among all CSI-RS resources included in the resource set(s) configured in the resource setting referenced by the report setting configured for the CSI report.

Hereinafter, embodiments of the present disclosure may consider both the two interpretations of the CSI-RS occasion. For example, in embodiments of the present disclosure, the respective interpretations of the CSI-RS occasion may be applied individually. Also, in embodiments of the present disclosure, both the two interpretations of the CSI-RS occasion may be considered for the CSI-IM occasion and the SSB occasion. However, because the principle is similar to the above description, a redundant description thereof will be omitted below.

In embodiments of the present disclosure, the CSI-RS/CSI-IM/SSB occasion for CSI report #X to be transmitted at 'UL slot n' may refer to a set of a CSI-RS occasion, a CSI-IM occasion, an SSB occasion not later than a CSI reference resource of CSI report #X to be transmitted at UL slot n' among CSI-RS occasions, CSI-IM occasions, SSB occasions of CSI-RS resources, CSI-IM resources, and SSB resources included in the resource set configured in the resource setting referenced by the report setting configured for CSI report #X.

In embodiments of the present disclosure, the following two interpretations are possible for the latest CSI-RS/CSI-IM/SSB occasion among CSI-RS/CSI-IM/SSB occasions for CSI report #X to be transmitted at 'UL slot n'.

Interpretation 2-1: A set of occasions including the latest CSI-RS occasion among CSI-RS occasions for CSI report #X to be transmitted at UL slot n', the latest CSI-IM occasion among CSI-RS occasions for CSI report #X to be transmitted at UL slot n', and the latest SSB occasion among SSB occasions for CSI report #X to be transmitted at UL slot n'.

Interpretation 2-2: The latest occasion among CSI-RS occasion, CSI-IM occasion, and SSB occasion for CSI report #X to be transmitted at UL slot n ring Hereinafter, in embodiments of the present disclosure, the two interpretations of the latest CSI-RS/CSI-IM/SSB occasion among CSI-RS/CSI-IM/SSB occasions for CSI report #X to be transmitted at UL slot n ring may be considered. For example, in embodiments of the present disclosure, the respective interpretations of the latest CSI-RS/CSI-IM/SSB occasion may be applied individually. Also, in embodiments of the present disclosure, considering the above-described two interpretations (Interpretation 1-1 and Interpretation 1-2) for the CSI-RS occasion, the CSI-IM occasion, and the SSB occasion, "the latest CSI-RS/CSI-IM/SSB occasion among CSI-RS/CSI-IM/SSB occasions for CSI report #X to be transmitted at UL slot n ring" may consider four different interpretations (application of Interpretation 1-1 and Interpretation 2-1, application of Interpretation 1-1 and Interpretation 2-2, application of Interpretation 1-2 and Interpretation 2-1, and application of Interpretation 1-2 and Interpretation 2-2). For example, in embodiments of the present disclosure, the above-described four interpretations may be applied individually.

The base station may indicate the CSI report considering the amount of channel information that the UE is able to simultaneously calculate for the CSI report, that is, the number of CSI processing units (CPUs) of the UE. When the number of CPUs that the UE is able to simultaneously calculate is $N_{CPU}$, the UE does not expect the CSI report indication of the base station that requires more channel information calculation than the $N_{CPU}$, or may not consider the update of channel information that requires more channel information calculation than $N_{CPU}$. The UE may report $N_{CPU}$ to the base station through higher layer signaling, or the base station may configure $N_{CPU}$ through higher layer signaling.

It is assumed that the CSI report indicated to the UE by the base station occupies all or part of the CPU for channel information calculation among the total number $N_{CPU}$ of channel information that the UE is able to calculate simultaneously. When the number of CPUs required for each CSI report, for example, CSI report n (n=0, 1, . . . , N−1) is $0_{CPU}^{(n)}$, the number of CPUs required for a total of N CSI reports may be $\Sigma_{n=0}^{N-1} 0_{CPU}^{(n)}$. When the number of channel information calculations required by the UE for multiple CSI reports at a specific time point is greater than the number $N_{CPU}$ of CPUs that the UE is able to calculate simultaneously, the UE may not consider the update of channel information for some CSI reports. Among the indicated CSI reports, the CSI report that does not consider the update of channel information may be determined considering at least one piece of information of the time at which the channel information calculation required for the CSI report occupies the CPU, the importance of channel information to be reported, or CSI priority. For example, the base station or the UE may not consider the update of channel information for the CSI report that is started when the time at which the channel information calculation required for the CSI report occupies the CPU is the latest, and may not consider the update of channel information preferentially for the CSI report having a low CSI priority of channel information.

The CSI priority may be determined with reference to Table 8 below.

TABLE 8

CSI priority value $\text{Pri}_{iCSI}(y, k, c, s) =$
$2 \cdot N_{cells} \cdot M_S \cdot y + N_{cells} \cdot M_S \cdot k + M_s \cdot c + s$ y = 0. In case of aperiodic CSI report to be transmitted through PUSCH,
y = 1. In the case of semi-persistent CSI report to be transmitted through PUSCH, y = 2. In the case of semi-persistent CSI report to be transmitted through PUCCH, y = 3. In case of periodic CSI report to be transmitted through PUCCH;
k = 0. In case in which CSI report includes L1-RSRP, and k = 1. In case in which CSI report does not include L1-RSRP;
c: serving cell index, $N_{cells}$: The maximum number of serving cells configured through higher layer signaling (maxNrofServingCells);
s: CSI report configuration index (reportConfigID), $M_s$: The maximum number of CSI report configurations configured through higher layer signaling (maxNrofCSI-ReportConfigurations).

The CSI priority for the CSI report may be determined through the priority value $\text{Pri}_{iCSI}(y, k, c, s)$ in Table 8. Referring to Table 8, the CSI priority value may be determined through the type of channel information included in the CSI report, the time domain report characteristics of the CSI report (aperiodic, semi-persistent, periodic), the channel through which the CSI report is transmitted (PUSCH, PUCCH), the serving cell index, and the CSI report configuration index. The base station or the UE determines that the CSI priority for the CSI report having a small priority value is high through comparison of the priority value $\text{Pri}_{iCSR}(y, k, c, s)$.

When the time at which the channel information calculation required for the CSI report indicated to the UE by the base station occupies the CPU is the CPU occupation time, the CPU occupation time may be determined considering at least one piece of information of the type of channel information included in the CSI report (report quantity), time domain characteristics of the CSI report (aperiodic, semi-persistent, periodic), the slot or symbol occupied by higher layer signaling or DCI indicating the CSI report, or the slot or symbol occupied by the reference signal for channel state measurement.

Figure 9:
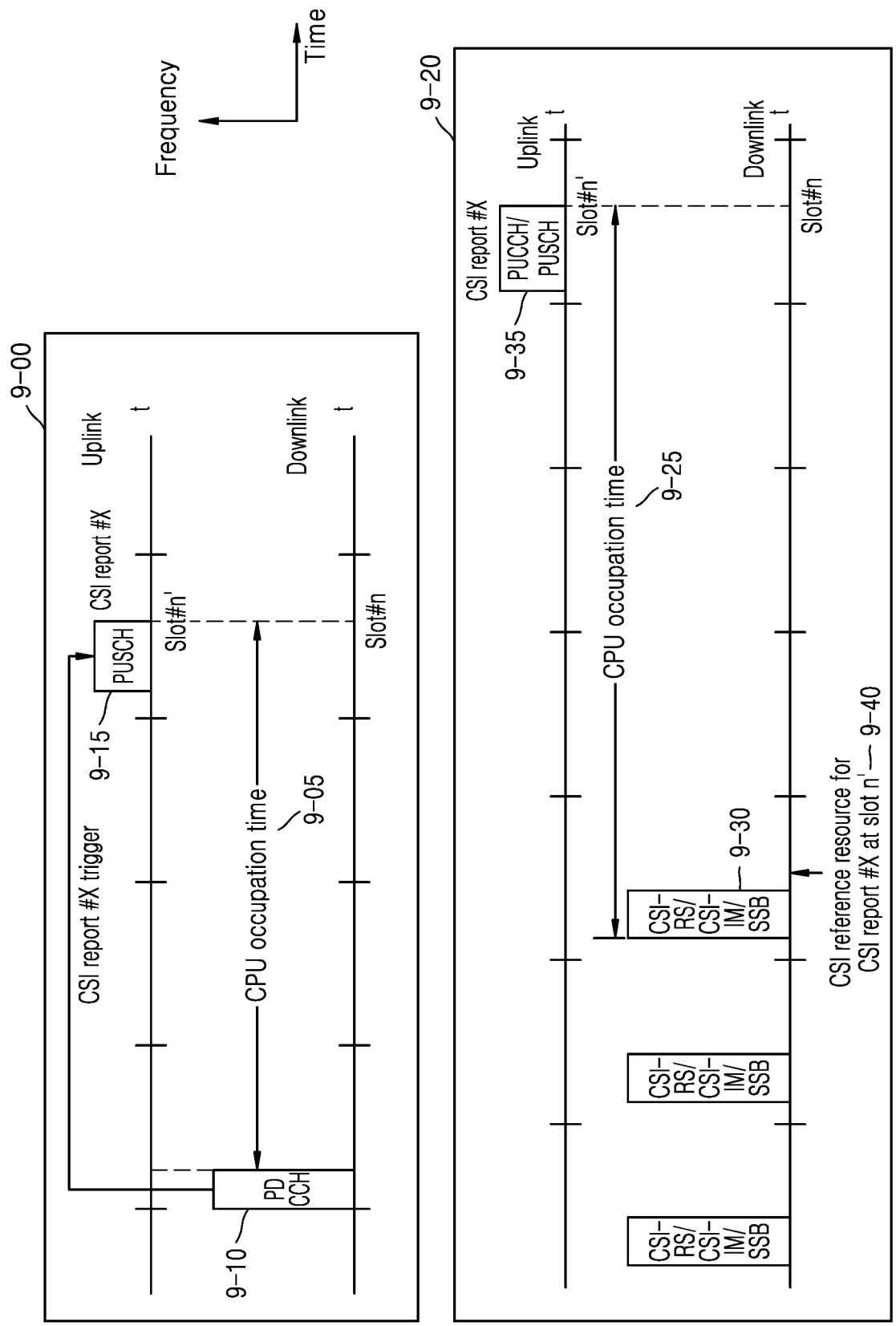
FIG. 9 is a diagram illustrating an example of a channel state information (CSI) processing unit (CPU) occupation time for a CSI report in which a report quantity included in the CSI report is not set to 'none', according to an embodiment of the present disclosure.

FIG. 9 is a diagram illustrating an example of the CPU occupation time for the CSI report in which the report quantity included in the CSI report is not set to 'none', according to an embodiment of the present disclosure.

9-00 of FIG. 9 is a diagram illustrating the CPU occupation time for the aperiodic CSI report in which the report quantity included in the CSI report is not set to 'none', according to an embodiment of the present disclosure. When the base station indicates aperiodic CSI report #X to the UE at UL slot n' through DCI using DCI format 0_1, a CPU occupation time 9-05 for CSI report #X to be transmitted at UL slot n' may be defined from a next symbol of the last symbol occupied by a PDCCH 9-10 including DCI indicating aperiodic CSI report #X to the last symbol occupied by a PUSCH 9-15 including CSI report #X to be transmitted at UL slot n'.

9-20 of FIG. 9 is a diagram illustrating the CPU occupation time for the periodic or semi-persistent CSI report in which the report quantity included in the CSI report is not set to 'none', according to an embodiment of the present disclosure. When the base station indicates to transmit periodic or semi-persistent CSI report #X at UL slot n' through higher layer signaling or DCI using DCI format 0_1 scrambled by SP-CSI-RNTI, a CPU occupation time 9-25 for CSI report #X to be transmitted at UL slot n' may be defined from the first symbol of the earliest transmitted CSI-RS/CSI-IM/SSB resource corresponding to the latest CSI-RS/CSI-IM/SSB occasion 9-30 among CSI-RS/CSI-IM/SSB occasions for CSI report #X to be transmitted at UL slot n' to the last symbol occupied by a PUCCH or a PUSCH 9-35 including CSI report #X to be transmitted at UL slot n'. Exceptionally, when the base station indicates the semi-persistent CSI report through DCI and the UE performs the first CSI report of semi-persistent CSI report #X, the CPU occupation time for the first CSI report may be defined from the next symbol of the last symbol occupied by the PDCCH including the DCI indicating semi-persistent CSI report #X to the last symbol occupied by the PUSCH including the first CSI report. By defining the CPU occupation time as described above, time domain operation causality of the UE may be guaranteed by considering the time point at which the CSI report is indicated and the time point at which the CPU occupation time is started.

For example, the CPU occupation time may be determined according to a rule as shown in Table 9 below.

TABLE 9

For a CSI report with CSI-ReportConfig with higher layer parameter reportQuantity not set to 'none', the CPU(s) are occupied for a number of OFDM symbols as follows:

A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
An aperiodic CSI report occupies CPU(s) from the first symbol after the PDCCH triggering the CSI report until the last symbol of the PUSCH carrying the report.
An initial semi-persistent CSI report on PUSCH after the PDCCH trigger occupies CPU(s) from the first symbol after the PDCCH until the last symbol of the PUSCH carrying the report.

Figure 10:
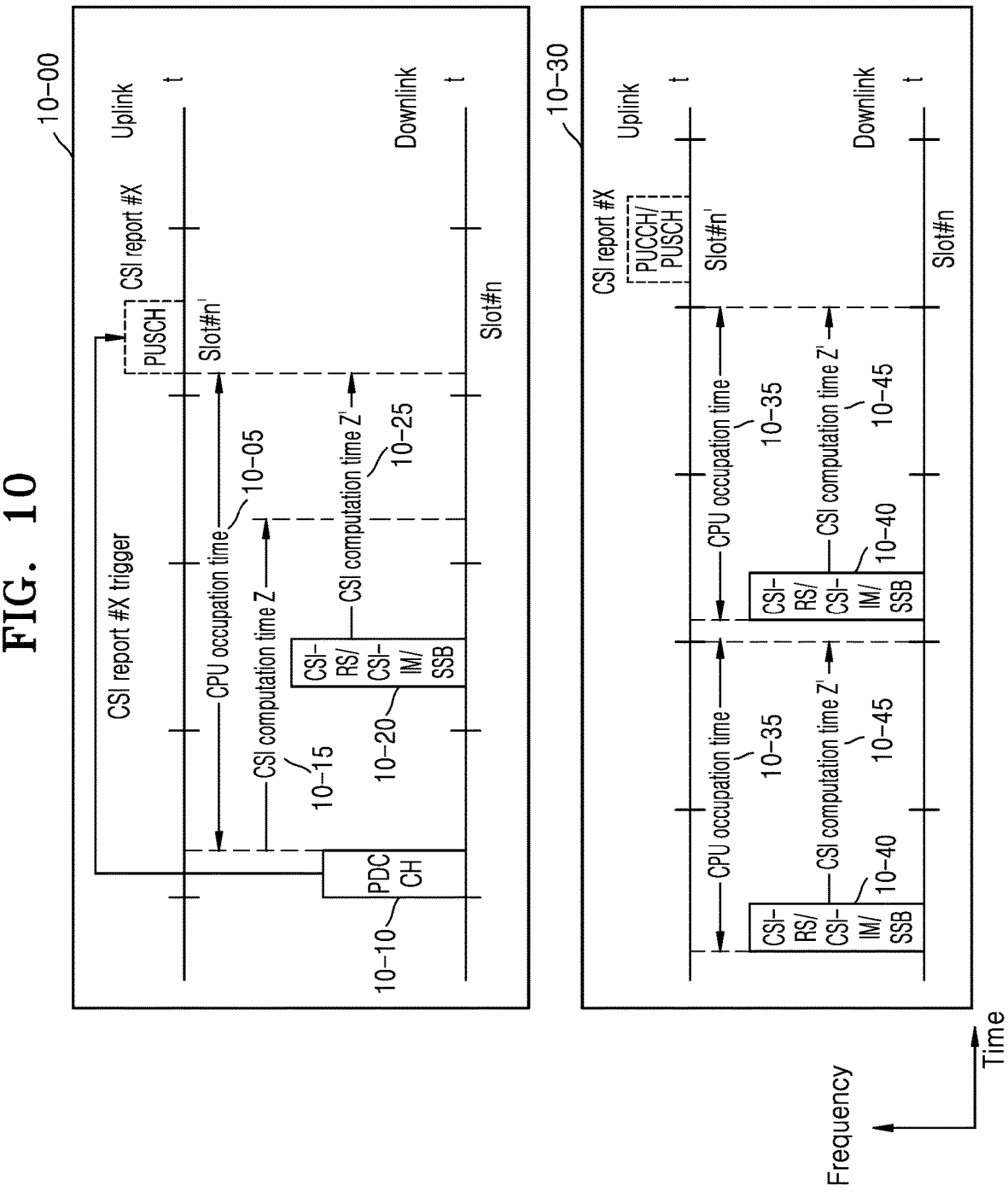
FIG. 10 is a diagram illustrating an example of a CPU occupation time for a CSI report in which a report quantity included in the CSI report is set to 'none', according to an embodiment of the present disclosure.

FIG. 10 is a diagram illustrating an example of the CPU occupation time for the CSI report in which the report quantity included in the CSI report is set to 'none', according to an embodiment of the present disclosure.

10-00 of FIG. 10 is a diagram illustrating the CPU occupation time for the aperiodic CSI report in which the report quantity included in the CSI report is set to 'none', according to an embodiment of the present disclosure. When the base station indicates aperiodic CSI report #X to the UE at UL slot n' through DCI using DCI format 0_1, a CPU occupation time 10-05 for CSI report #X to be transmitted at UL slot n' may be defined from a next symbol of the last symbol occupied by a PDCCH 10-10 including DCI indicating aperiodic CSI report #X to a symbol at which the CSI computation is completed. The symbol at which the above-described CSI computation is completed may refer to a symbol after a CSI computation time Z 10-15 of the last symbol occupied by the PDCCH including DCI indicating CSI report #X and the latest symbol among the symbols after a CSI computation time Z' 10-25 of the last symbol of the most recent CSI-RS/CSI-IM/SSB occasion 10-20 for CSI report #X to be transmitted at UL slot n'.

10-30 of FIG. 10 is a diagram illustrating the CPU occupation time for the periodic or semi-persistent CSI report in which the report quantity included in the CSI report is set to 'none', according to an embodiment of the present disclosure. When the base station indicates to transmit periodic or semi-persistent CSI report #X at UL slot n' through higher layer signaling or DCI using DCI format 0_1 scrambled by SP-CSI-RNTI, a CPU occupation time 10-35 for CSI report #X to be transmitted at UL slot n' may be defined from the first of the earliest transmitted CSI-RS/CSI-IM/SSB resource corresponding to each CSI-RS/CSI-IM/SSB occasion 10-40 for CSI report #X to be transmitted at UL slot n' to a symbol after a CSI computation time Z' 10-45 of the last symbol of the CSI-RS/CSI-IM/SSB resource transmitted the latest.

For example, the CPU occupation time may be determined according to a rule as shown in Table 10 below.

TABLE 10

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:

A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z'_3$ symbols after the last symbol of the latest one of the CSI-RS/SSB resource for channel measurement for L1-RSRP computation in each transmission occasion. An aperiodic CSI report occupies CPU(s) from the first symbol after the PDCCH triggering the CSI report until the last symbol between $Z_3$ symbols after the first symbol after the PDCCH triggering the CSI report and $Z'_3$ symbols after the last symbol of the latest one of each CSI-RS/SSB resource for channel measurement for L1-RSRP computation.

According to an embodiment of the present disclosure, when the base station activates or deactivates the semi-persistent CSI report to the UE through higher layer signaling or DCI, a method of determining the CPU occupation time is provided to improve the efficiency of the channel state measurement and the indication for the CSI report of the base station and the UE. In an embodiment of the present disclosure, the case in which the UE reports channel measurement information to the base station in the CSI report and the case in which the report is not performed to the base station after channel measurement are regarded individually, and the application range may be limited to the CPU occupation time for the CSI report in which the report quantity included in the CSI report indicated by the base station to the UE through higher layer signaling or DCI is not set to 'none'.

Hereinafter, embodiments of the present disclosure will be described in detail with reference to the accompanying drawings. In describing the present disclosure, when the detailed description of the relevant known functions or configurations is determined to unnecessarily obscure the gist of the present disclosure, the detailed description thereof may be omitted herein. The terms as used herein are those defined by taking into account functions in the present disclosure, but the terms may vary depending on the intention of users or those of ordinary skill in the art, precedents, or the like. Therefore, the definitions should be made based on the contents throughout the specification.

Hereinafter, examples are described through a plurality of embodiments in the present disclosure, but these are not independent and one or more embodiments may be applied simultaneously or in combination.

First Embodiment: A Method of Determining CPU Occupation Time for First CSI Report when Semi-Persistent CSI Report is Activated The base station may activate the semi-persistent CSI report to the UE through higher layer signaling or DCI. When the semi-persistent CSI report of the UE is activated, the CPU occupation time for the first CSI report may be determined considering at least one piece of information of the time point of the slot or symbol including higher layer signaling or DCI to activate the semi-persistent CSI report, the time point of the slot or symbol including the reference signal for channel information measurement reported in the first CSI report, or the time point of the slot or symbol including the PUCCH or PUSCH including the CSI report. Also, the CPU occupation time for the first CSI report may be dynamically determined by comparing the time point of the slot or symbol including higher layer signaling or DCI to activate the semi-persistent CSI report with the time point of the slot or symbol including the reference signal for channel information measurement reported in the first CSI report. Also, the CPU occupation time for the first CSI report may be determined considering application delay or decoding time of higher layer signaling or DCI to activate the semi-persistent CSI report.

The method of determining the CPU occupation time, according to an embodiment of the present disclosure, efficiently determines the CPU occupation time for the first CSI report. Thus, the CSI calculation capability of the UE may be maximized to increase the CSI report quality of the UE. Also, the method of determining the CPU occupation time, according to an embodiment of the present disclosure, ensures the time domain operation causality between the time point when the CSI report is activated and the CPU occupation time, thereby preventing mistakes between the base station and the UE.

(1-1)th Embodiment: A Method of Determining CPU Occupation Time for First CSI Report when Semi-Persistent CSI Report is Activated Through DCI Hereinafter, the method of determining the CPU occupation time for the first CSI report when the base station activates the semi-persistent CSI report to the UE through DCI using DCI format 0_1 scrambled by SP-CSI-RNTI, according to an embodiment of the present disclosure, will be described.

Figure 11:
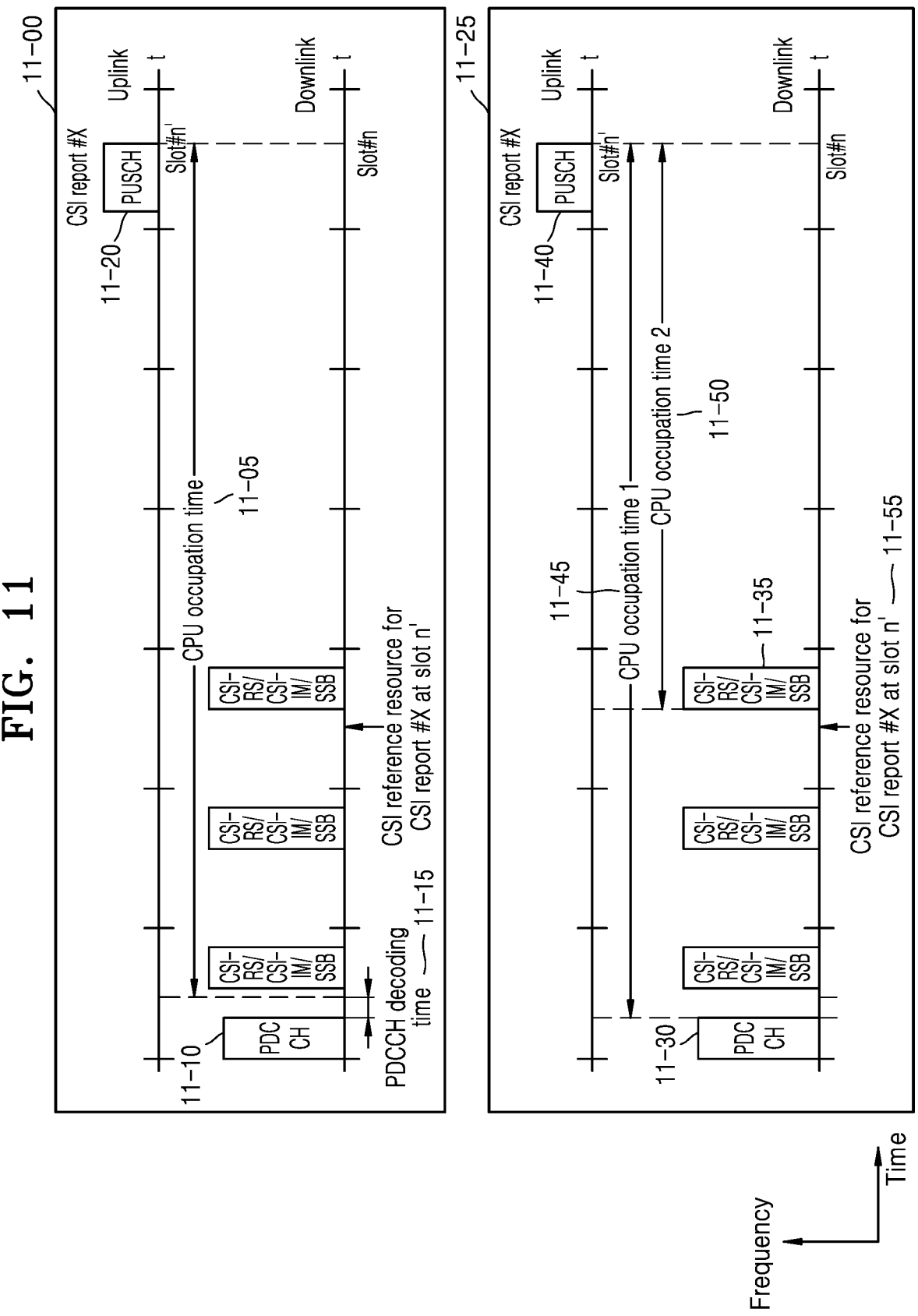
FIG. 11 is a diagram illustrating an example of a CPU occupation time for a first CSI report when a base station activates a semi-persistent CSI report through downlink control information (DCI) to a terminal, according to an embodiment of the present disclosure.

FIG. 11 is a diagram illustrating an example of the CPU occupation time for the first CSI report when the base station activates the semi-persistent CSI report to the UE through DCI, according to an embodiment of the present disclosure.

11-00 of FIG. 11 is a diagram illustrating an example in which the base station activates the semi-persistent CSI report and indicates the UE to transmit the first CSI report of semi-persistent CSI report #X at UL slot n', according to an embodiment of the present disclosure. According to an embodiment of the present disclosure, in order for the UE to recognize that the CSI report is activated, the CPU occupation time may be determined considering the additional need for a PDCCH decoding time for a PDCCH including DCI for activating the CSI report. A CPU occupation time 11-05 for the first CSI report of CSI report #X to be transmitted at UL slot n' may be defined from the symbol located at the time point after a PDCCH decoding time 11-15 from the time point at which the last symbol occupied by a PDCCH 11-10 including DCI for activating the CSI report #X ends, to the time point at which the last symbol occupied by a PUSCH 11-20 including CSI report #X to be transmitted at UL slot n' ends. In 11-00 of FIG. 11, a situation in which the UE starts channel information calculation for the first CSI report after finding out that the CSI report is activated through PDCCH decoding is reflected. The PDCCH decoding time 11-15 may be defined in units of absolute time (e.g., second) or in units of symbols or slots, and may be determined considering at least one piece of information of the numerology of the DL BWP, UE capability or power saving operation or non-operation, or the set value of CORESET including the PDCCH. Also, when the PDCCH decoding time 11-15 is not defined as a specific value because it is entrusted to the implementation capability of the UE, the CPU occupation time 11-05 may be determined without considering the PDCCH decoding time 11-15. For example, the PDCCH decoding time may not be considered or may be defined as 0 symbols, and the CPU occupation time 11-05 may be determined. The PDCCH decoding time may also be represented by a PDCCH application delay according to whether the UE performs the power saving operation, but in the present disclosure, it is referred to as a PDCCH decoding time.

11-25 of FIG. 11 is a diagram illustrating an example in which the base station activates the semi-persistent CSI report and indicates the UE to transmit the first CSI report of semi-persistent CSI report #X at UL slot n', according to an embodiment of the present disclosure. According to an embodiment of the present disclosure, in order to ensure the time domain operation causality of the UE, the CPU occupation time may be determined based on a comparison between the time point when the CSI report is activated and the time point when the channel measurement reference signal for the CSI report is transmitted. The start time of the CPU occupation time for the first CSI report of CSI report #X to be transmitted at UL slot n' may be determined considering the time order of the time point when the last symbol occupied by a PDCCH 11-30 including DCI for activating CSI report #X ends, and the start time of the first symbol of the earliest transmitted CSI-RS/CSI-IM/SSB resource corresponding to the latest CSI-RS/CSI-IM/SSB occasion 11-35 among CSI-RS/CSI-IM/SSB occasions for CSI report #X to be transmitted in uplink slot n'. For example, in order to ensure the time domain operation causality of the UE, a later time point among the time point when the last symbol occupied by the PDCCH 11-30 including DCI for activating CSI report #X ends and the start time of the first symbol of the earliest transmitted CSI-RS/CSI-IM/SSB resource corresponding to the latest CSI-RS/CSI-IM/SSB occasion 11-35 among CSI-RS/CSI-IM/SSB occasions for CSI report #X to be transmitted at UL slot n' may be determined as the start time of the CPU occupation time. The end time of the CPU occupation time for the first CSI report of CSI report #X to be transmitted at UL slot n' may be defined as the end time point of the last symbol occupied by a PUSCH 11-40 including CSI report #X to be transmitted at UL slot n'.

According to an embodiment of the present disclosure, the CPU occupation time for the first CSI report of CSI report #X to be transmitted at UL slot n' may be determined as a CPU occupation time that starts later among CPU occupation time 1 11-45 determined considering a time point from the time when the last symbol occupied by the PDCCH 11-30 including DCI for activating CSI report #X ends to the time point when the last symbol occupied by the PUSCH 11-40 including CSI report #X to be transmitted at UL slot n' ends, and a CPU occupation time 2 11-50 determined considering the start time of the first symbol of the earliest transmitted CSI-RS/CSI-IM/SSB resource corresponding to the latest CSI-RS/CSI-IM/SSB occasion (11-35) among CSI-RS/CSI-IM/SSB occasions for CSI report #X to be transmitted at UL slot n' and the time point when the last symbol occupied by the PUSCH 11-40 including CSI report #X to be transmitted at UL slot n' ends.

The method of determining the CPU occupation time, according to an embodiment of the present disclosure, dynamically determines the CPU occupation time considering the time point of the earliest transmitted CSI-RS/CSI-IM/SSB resource corresponding to the latest CSI-RS/CSI-IM/SSB occasion 11-35 among the CSI-RS/CSI-IM/SSB occasions for CSI report #X to be transmitted in the PDCCH including DCI for activating CSI report #X and UL slot n'. Thus, the CSI calculation capability of the UE may be maximized by ensuring the time domain operation causality of the UE and efficiently determining the CPU occupation time.

According to an embodiment of the present disclosure, considering that one or more of the embodiments described above are applied in the (1-1)th embodiment simultaneously or in combination, the symbol including the time point when the last symbol occupied by the PDCCH 11-30 including DCI for activating CSI report #X ends and the time point after the PDCCH decoding time is defined as the start time point of CPU occupation time 1 11-45, and the start time point comparison with the CPU occupation time 2 11-50 may be performed.

(1-2)th Embodiment: A Method of Determining CPU Occupation Time for First CSI Report when Semi-Persistent CSI Report is Activated Through Higher Layer Signaling Hereinafter, the method of determining the CPU occupation time for the first CSI report when the base station activates the semi-persistent CSI report to the UE through higher layer signaling including MAC CE, according to an embodiment of the present disclosure, will be described.

Figure 12:
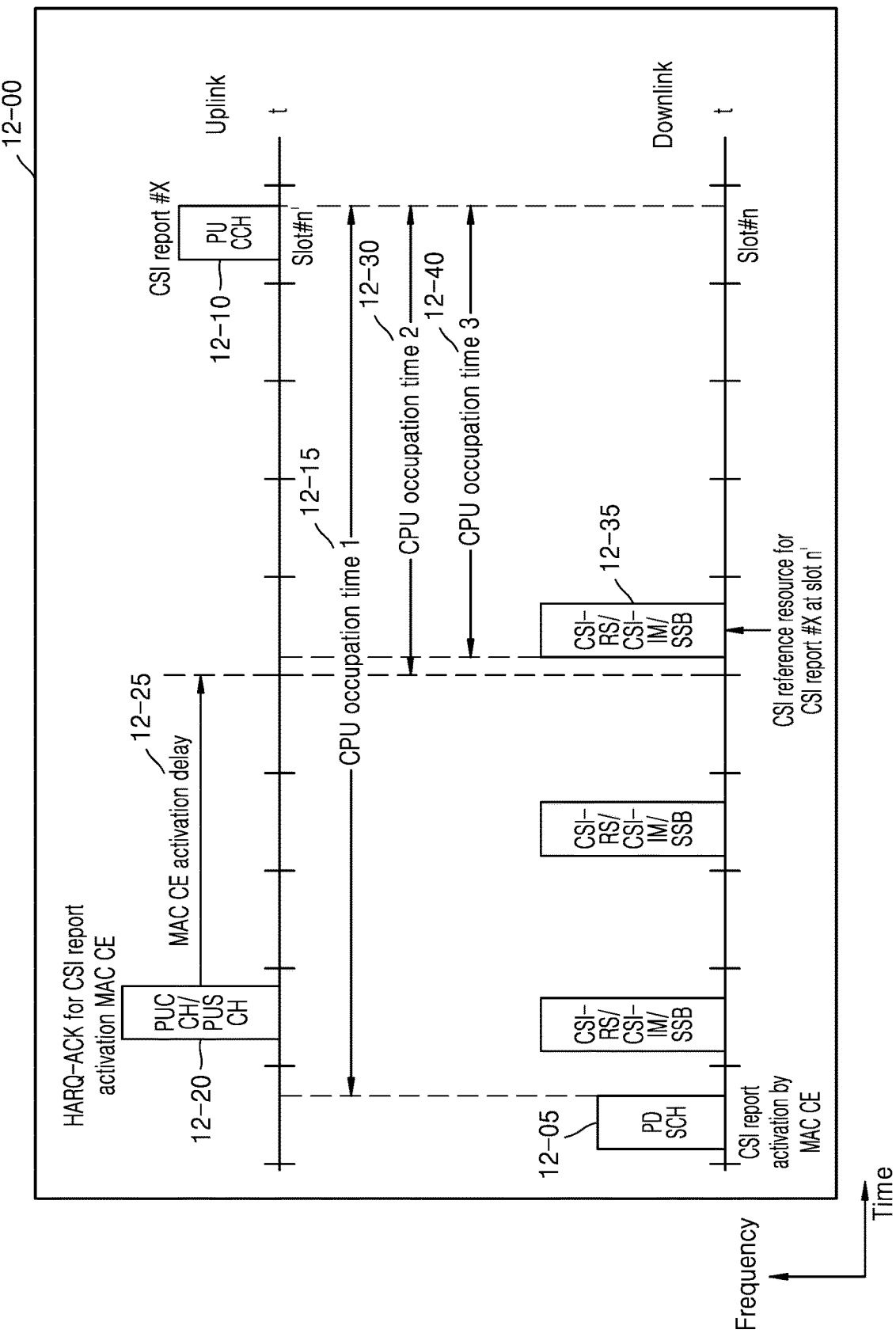
FIG. 12 is a diagram illustrating an example of a CPU occupation time for a first CSI report when a base station activates a semi-persistent CSI report through a medium access control (MAC) control element (CE) to a terminal, according to an embodiment of the present disclosure.

FIG. 12 is a diagram illustrating an example of the CPU occupation time for the first CSI report when the base station activates the semi-persistent CSI report to the UE through the MAC CE, according to an embodiment of the present disclosure.

12-00 of FIG. 12 is a diagram illustrating an example in which the base station activates the semi-persistent CSI report and indicates the UE to transmit the first CSI report of semi-persistent CSI report #X at UL slot n', according to an embodiment of the present disclosure.

According to an embodiment of the present disclosure, the CPU occupation time may be determined on the assumption of a situation in which the CPU occupation starts after the UE receives the higher layer signaling including the MAC CE for activating the CSI report. For example, the CPU occupation time for the first CSI report of CSI report #X to be transmitted at UL slot n' may be determined as CPU occupation time 1 12-15 from the time point when the last symbol occupied by a PDSCH 12-05 including the MAC CE to activate CSI report #X ends, to the time point when the last symbol occupied by a PUCCH 12-10 including the CSI report #X to be transmitted at UL slot n' ends.

According to an embodiment of the present disclosure, HARQ-ACK transmission for confirming whether the UE receives the MAC CE signaling for activating the CSI report is followed, and the CPU occupation time may be determined considering that the delay time is required until the MAC CE to activate the CSI report is actually applied to the UE. For example, the CPU occupation time for the first CSI report of CSI report #X to be transmitted at UL slot n' may be determined as CPU occupation time 2 12-30 from the time point after a MAC CE activation delay 12-25 of the time point when the last symbol of the PUCCH or PUSCH (12-20) including the HARQ-ACK transmission of the UE for the PDSCH 12-05 including the MAC CE to activate the CSI report #X ends, to the time point when the last symbol occupied by the PUCCH 12-10 including CSI report #X to be transmitted at UL slot n' ends. The MAC CE activation delay 12-25 represents the delay time taken until the MAC CE signaling of the base station is applied, may be determined to be 3 ms, or may be calculated that MAC CE signaling is applied from slots 3 $N_{slot}^{subframe,\mu}+1$ and later of the slot including the HARQ-ACK transmission of the UE for the MAC CE. $N_{slot}^{subframe,\mu}$ described above represents the number of slots included in one subframe.

According to an embodiment of the present disclosure, the CPU occupation time for the first CSI report of CSI report #X to be transmitted at UL slot n' may be determined as CPU occupation time 3 12-40 from the start time point of the first symbol of the earliest transmitted CSI-RS/CSI-IM/SSB resource corresponding to the latest CSI-RS/CSI-IM/SSB occasion 12-35 among CSI-RS/CSI-IM/SSB occasions for CSI report #X to be transmitted at UL slot n', to the time point when the last symbol occupied by the PUCCH 12-10 including CSI report #X to be transmitted at UL slot n' ends.

According to an embodiment of the present disclosure, the CPU occupation time that starts later among the CPU occupation time 1 12-15, the CPU occupation time 2 12-30, and the CPU occupation time 3 12-40 may be determined as the CPU occupation time of the UE. For example, the CPU occupation time for the first CSI report of CSI report #X to be transmitted at UL slot n' may be determined as the CPU occupation time that starts later among the CPU occupation time 1 12-15 and the CPU occupation time 3 12-40. For example, the CPU occupation time for the first CSI report of CSI report #X to be transmitted at UL slot n' may be determined as the CPU occupation time that starts later among the CPU occupation time 2 12-30 and the CPU occupation time 3 12-40. The method of determining the CPU occupation time, according to an embodiment of the present disclosure described above, ensures the time domain operation causality of the UE and efficiently determines the CPU occupation time, thereby fully utilizing the CSI calculation capability of the UE.

Second Embodiment: A Method of Determining CPU Occupation Time for Deactivated CSI Report when Semi-Persistent CSI Report is Deactivated According to an embodiment of the present disclosure, the base station may deactivate the semi-persistent CSI report to the UE through higher layer signaling or DCI. When the semi-persistent CSI report of the UE is deactivated, the CPU occupation time for the earliest CSI report among the deactivated CSI reports may be determined considering at least one of the time point of the slot or symbol including higher layer signaling or DCI to deactivate the semi-persistent CSI report, the time point of the slot or symbol including the reference signal for channel information measurement reported by the earliest CSI report among the deactivated CSI reports, or the time point of the slot or symbol including PUCCH or PUSCH scheduled to include the earliest CSI report among the deactivated CSI reports. Also, the CPU occupation time for the earliest CSI report among the deactivated CSI reports may be dynamically determined based on a comparison between the time point of the slot or symbol including higher layer signaling or DCI to deactivate the semi-persistent CSI report, and the time point of the slot or symbol including the reference signal for channel information measurement reported by the earliest CSI report among the deactivated CSI reports. Also, the CPU occupation time for the earliest CSI report among the deactivated CSI reports may be determined considering application delay or decoding delay of higher layer signaling or DCI to deactivate the semi-persistent CSI report. In addition, according to an embodiment of the present disclosure, in order to ensure the time domain operation causality of the UE, the base station is forced not to transmit higher layer signaling or DCI for deactivation of the semi-persistent CSI report that does not guarantee the time domain operation causality of the UE, or the UE may not expect higher layer signaling or DCI for deactivation of the semi-persistent CSI report that does not guarantee the time domain operation causality. The method of determining the CPU occupation time, according to an embodiment of the present disclosure, efficiently determines the CPU occupation time for the earliest CSI report among the deactivated CSI reports, thereby preventing the UE from occupying unnecessary CPU and thus maximizing the CSI calculation capability of the UE. Also, the method of determining the CPU occupation time, according to an embodiment of the present disclosure, ensures the time domain operation causality between the time point when the CSI report is deactivated and the CPU occupation time, thereby preventing mistakes between the base station and the UE.

Figure 13:
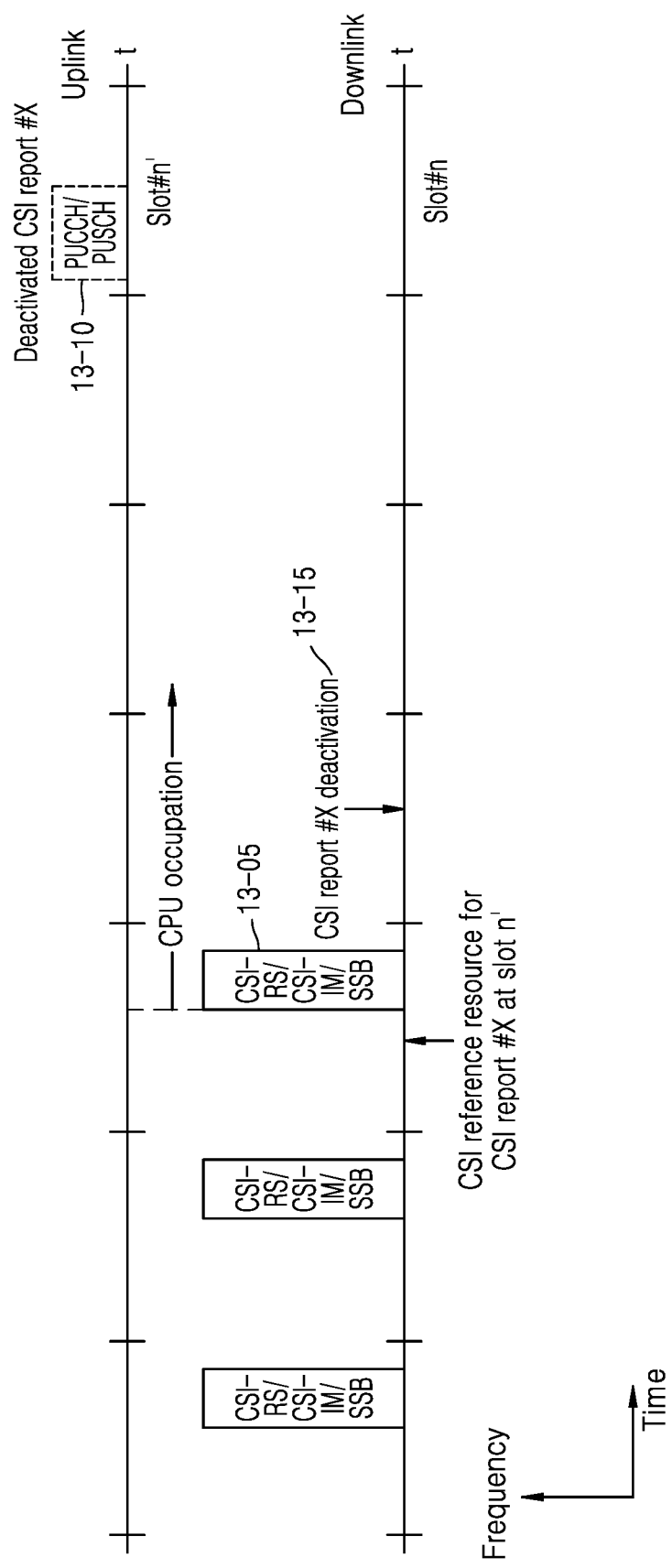
FIG. 13 is an example of the assumption of a CPU occupation or a CPU occupation time of a terminal when a base station deactivates a semi-persistent CSI report through higher layer signaling or DCI to a terminal, according to an embodiment of the present disclosure.

FIG. 13 is an example of the assumption of the CPU occupation or the CPU occupation time of the UE when the base station deactivates the semi-persistent CSI report to the UE through higher layer signaling or DCI, according to an embodiment of the present disclosure.

FIG. 13 illustrates a situation in which the base station deactivates semi-persistent CSI report #X to the UE through higher layer signaling or DCI, and PUCCH or PUSCH including the deactivated first CSI report in the CSI report #X is included at UL slot n'. According to the method of determining the CPU occupation time for the semi-persistent CSI report in which the report quantity included in the CSI report is not set to 'none', before receiving higher layer signaling or DCI of the base station deactivating CSI report #X or before the deactivation is applied, the UE may determine that the CPU occupation time for CSI report #X to be transmitted at UL slot n' starts from the first symbol of the earliest transmitted CSI-RS/CSI-IM/SSB resource corresponding to the latest CSI-RS/CSI-IM/SSB occasion 13-05 among CSI-RS/CSI-IM/SSB occasions for CSI report #X to be transmitted at UL slot n'. However, when the CSI report #X to be transmitted at UL slot n' through higher layer signaling or DCI is deactivated after the CPU occupation time starts, the UE does not transmit CSI report #X 13-10 scheduled at UL slot n'. Thus, the CPU occupation for CSI report #X 13-10 may not be considered. When the start time of the CPU occupation time for CSI report #X at the deactivated UL slot n' occurs before the deactivation time 13-15 for CSI report #X at UL slot n', and thus, the CPU occupation for the deactivated CSI report is not considered, the time domain operation causality of the UE may not be guaranteed. In embodiments of the present disclosure, the situation "when the time domain operation causality of the UE for the deactivated CSI report may not be guaranteed" may be variously interpreted according to a situation "when the start time of the CPU occupation time for the deactivated CSI report occurs before the deactivation time for the CSI report", a situation "when the start time of the first symbol of the earliest transmitted CSI-RS/CSI-IM/SSB resource corresponding to the latest CSI-RS/CSI-IM/SSB occasion among the CSI-RS/CSI-IM/SSB occasions set for the deactivated CSI report occurs before the deactivation time point for the CSI report. However, for convenience of description, the embodiment of the present disclosure will be described by using at least one of the above-described expressions.

In providing the method of determining the CPU occupation time for the deactivated CSI report when the base station deactivates the semi-persistent CSI report through higher layer signaling or DCI, according to an embodiment of the present disclosure, embodiments of the present disclosure may have a limited scope of application to providing the method of determining the CPU occupation time for the deactivated CSI report "when the time domain operation causality of the UE for the deactivated CSI report may not be guaranteed".

(2-1)th Embodiment: A Method of Determining CPU Occupation Time for Deactivated CSI Report when Semi-Persistent CSI Report is Deactivated Through DCI Hereinafter, the method of determining the CPU occupation time for the deactivated CSI report when the base station deactivates the semi-persistent CSI report to the UE through DCI using DCI format 0_1 scrambled by SP-CSI-RNTI, according to an embodiment of the present disclosure, will be described.

Figure 14:
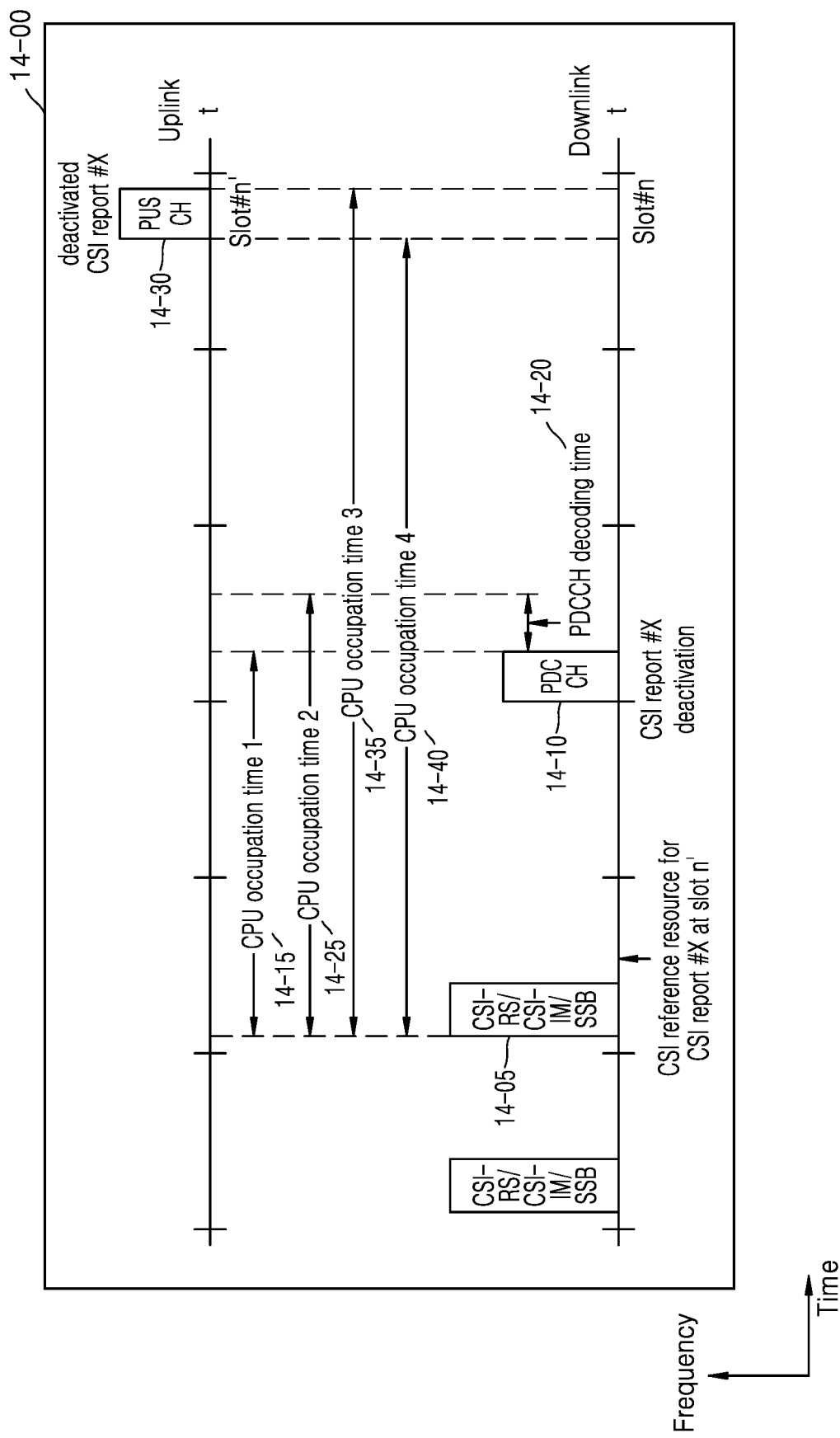
FIG. 14 is a diagram illustrating an example of a CPU occupation time for a deactivated first CSI report when a base station deactivates a semi-persistent CSI report through DCI to a terminal, according to an embodiment of the present disclosure.

FIG. 14 is a diagram illustrating an example of the CPU occupation time for the deactivated first CSI report when the base station deactivates the semi-persistent CSI report to the UE through DCI, according to an embodiment of the present disclosure.

14-00 of FIG. 14 is a diagram illustrating an example in which the base station deactivates semi-persistent CSI report #X and indicates to deactivate the CSI report #X transmission at UL slot n', according to an embodiment of the present disclosure.

The method according to an embodiment of the present disclosure may determine that there is no CPU occupation time for the deactivated CSI report. That is, the CPU occupation in the UE for CSI report #X at UL slot n' deactivated through DCI may not be considered. Accordingly, it may be determined that there is no CPU occupation time in the UE for CSI report #X at UL slot n' deactivated through DCI. The above-described method according to an embodiment of the present disclosure may not guarantee the time domain operation causality of the UE, but the CPU occupation for the deactivated CSI report is not considered. Therefore, unnecessary CPU occupation of the UE may be prevented and the channel information measurement capability of the UE may be efficiently utilized.

The method according to an embodiment of the present disclosure may determine the CPU occupation time considering a situation in which the CPU occupation ends when the UE recognizes that the CSI report is deactivated. The CPU occupation time for CSI report #X at UL slot n' deactivated through DCI may be determined as a CPU occupation time 1 14-15 from the start time point of the first symbol of the earliest transmitted CSI-RS/CSI-IM/SSB resource corresponding to the latest CSI-RS/CSI-IM/SSB occasion 14-05 among CSI-RS/CSI-IM/SSB occasions for CSI report #X to be transmitted at UL slot n', to the time point when the PDCCH including DCI to deactivate CSI report #X at UL slot n' ends. The method of determining the CPU occupation time of the UE as the CPU occupation time 1 14-15 may prevent unnecessary CPU occupation for the deactivated CSI report, and may guarantee the time domain operation causality of the UE.

According to an embodiment of the present disclosure, in order for the UE to recognize that the CSI report is deactivated, the CPU occupation time may be determined considering the additional need for the PDCCH decoding time for the PDCCH including DCI to be deactivated. The CPU occupation time for CSI report #X at UL slot n' deactivated through DCI may be determined as a CPU occupation time 2 14-25 from the start time point of the first symbol of the earliest transmitted CSI-RS/CSI-IM/SSB resource corresponding to the latest CSI-RS/CSI-IM/SSB occasion 14-05 among CSI-RS/CSI-IM/SSB occasions for CSI report #X to be transmitted at UL slot n', to the time point when the symbol including the time point after the PDCCH decoding time 14-20 from the time when the last symbol occupied by the PDCCH including DCI to deactivate CSI report #X at UL slot n' ends. The method of determining the CPU occupation time of the UE as the CPU occupation time 2 14-25 may additionally consider the PDCCH decoding time required for the UE to recognize that the CSI report is deactivated. The PDCCH decoding time may be defined in units of absolute time (e.g., second) or units of symbols or slots, and may be determined considering at least one piece of information of the numerology of DL BWP, UE capability, or the set value of CORESET including PDCCH. When the PDCCH decoding time is not defined as a specific value because it is entrusted to the implementation capability of the UE, the PDCCH decoding time may not be considered. For example, the PDCCH decoding time may not be considered, or may be defined as 0 symbols.

The method according to an embodiment of the present disclosure may determine that the CPU occupation time assumed before the UE recognizes that the CSI report is deactivated is assumed to be the same even after the UE is deactivated. The CPU occupation time for CSI report #X at UL slot n' deactivated through DCI may be determined as a CPU occupation time 3 14-35 from the start time point of the first symbol of the earliest transmitted CSI-RS/CSI-IM/SSB resource corresponding to the latest CSI-RS/CSI-IM/SSB occasion 14-05 among CSI-RS/CSI-IM/SSB occasions for CSI report #X to be transmitted at UL slot n', to the time point when the last symbol occupied by the PUSCH 11-40 including the deactivated CSI report #X scheduled at UL slot n' ends. The CPU occupation time assumed at the time point when the CPU occupation starts before the UE recognizes that the CSI report is deactivated is not changed even after the deactivation, thereby reducing the computational complexity for the CPU occupation or the CPU occupation time of the UE.

The method according to an embodiment of the present disclosure may determine that the CPU occupation time assumed before the UE recognizes that the CSI report is deactivated is assumed equally even after the deactivation, and may determine that the CPU occupation is stopped at the time point when the PUSCH including the CSI report is not transmitted because the CSI report is deactivated. The CPU occupation time for CSI report #X at UL slot n' deactivated through DCI may be determined as a CPU occupation time 4 14-40 from the start time point of the first symbol of the earliest transmitted CSI-RS/CSI-IM/SSB resource corresponding to the latest CSI-RS/CSI-IM/SSB occasion 14-05 among CSI-RS/CSI-IM/SSB occasions for CSI report #X to be transmitted at UL slot n', to the time point when the first symbol occupied by the PUSCH 11-40 including the deactivated CSI report #X scheduled at UL slot n' starts. The CPU occupation time assumed at the time point the CPU occupation starts before the UE recognizes that the CSI report is deactivated is not changed even after the deactivation, and the CPU occupation is stopped at the time point when the PUSCH including the CSI report is not transmitted, thereby preventing unnecessary CPU occupation of the UE.

Also, the method according to an embodiment of the present disclosure may determine the CPU occupation time for the deactivated CSI report by semi-static or dynamical change through higher layer signaling or DCI. For example, the CPU occupation time for CSI report #X at UL slot n' deactivated through DCI may be determined as the CPU occupation time 2 14-25 or the CPU occupation time 3 14-35, and the base station may indicate whether to determine the CPU occupation time as the CPU occupation time 2 14-25 or the CPU occupation time 3 14-35 through higher layer signaling including RRC signaling. Alternatively, the base station may indicate whether to determine the CPU occupation time as the CPU occupation time 2 14-25 or the CPU occupation time 3 14-35 through DCI for deactivating the CSI report. When the base station indicates the method of determining the CPU occupation time through DCI for deactivating the CSI report, DCI may include one or more additional bits for determining the CPU occupation time, and the interpretation of the bits included in the DCI may be changed. According to the embodiment of the present disclosure described above, the base station changes the CPU occupation time for the deactivated CSI report semi-statically or dynamically through higher layer signaling or DCI. Therefore, it is possible to prevent unnecessary CPU occupation of the UE by stopping the CPU occupation early according to the situation. The terminal may efficiently utilize the channel information calculation capability. By not changing the assumption for the CPU occupation time, it is possible to reduce the computational complexity of the CPU occupation or the CPU occupation time of the UE.

The method of determining the CPU occupation time for the deactivated CSI report by semi-static or dynamical change through higher layer signaling or DCI is not limited to the CPU occupation time indication for the CPU occupation time 2 14-25 or the CPU occupation time 3 14-35, and may be equally applied to at least one of the CPU occupation time 1 14-15, the CPU occupation time 2 14-25, the CPU occupation time 3 14-35, or the CPU occupation time 4 14-40.

(2-2)th Embodiment: A Method of Determining CPU Occupation Time for Deactivated CSI Report when Semi-Persistent CSI Report is Deactivated Through Higher Layer Signaling Hereinafter, the method of determining the CPU occupation time for the deactivated CSI report when the base station deactivates the semi-persistent CSI report to the UE through higher layer signaling including MAC CE, according to an embodiment of the present disclosure, will be described.

Figure 15:
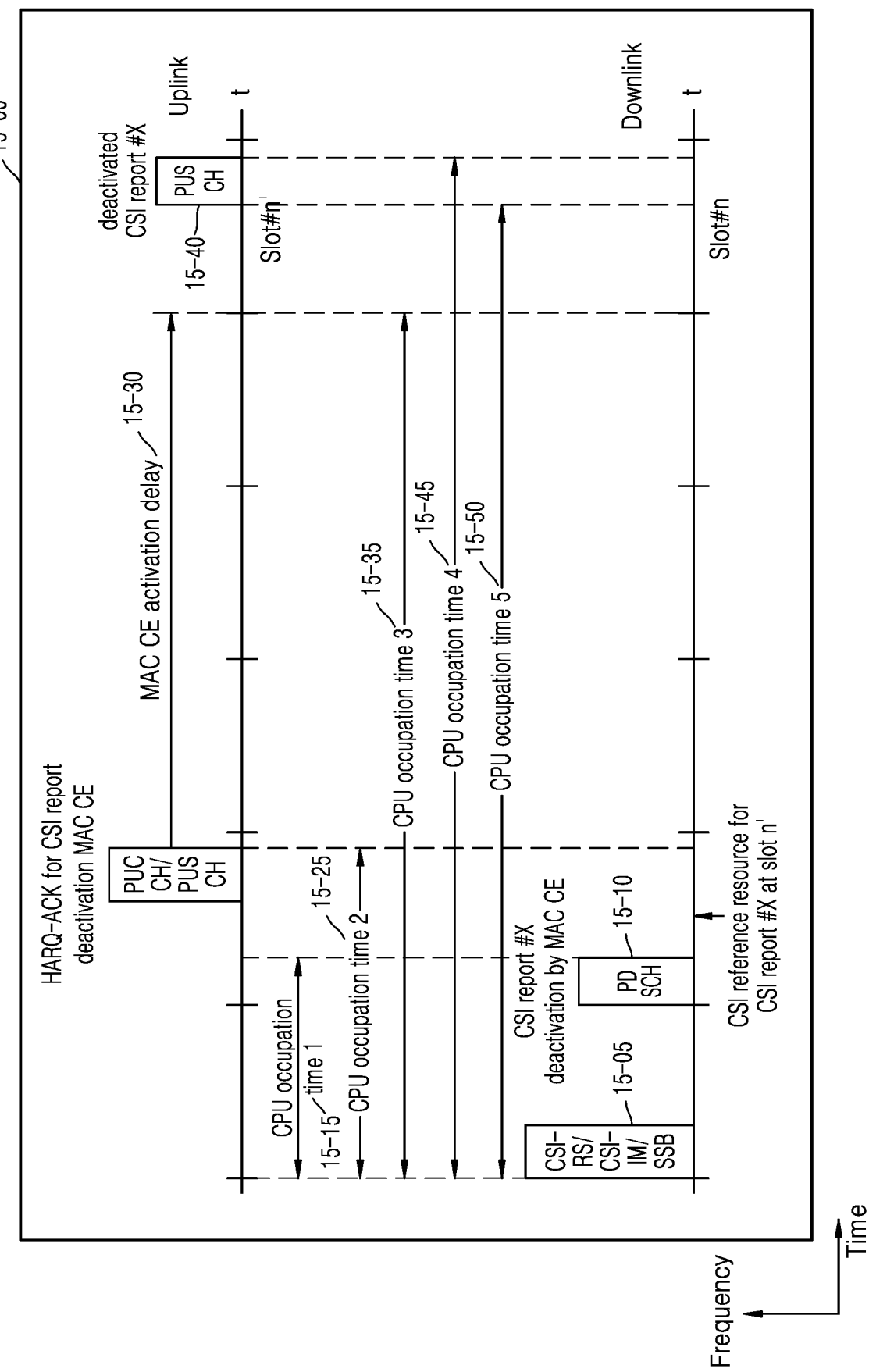
FIG. 15 is a diagram illustrating an example of a CPU occupation time for a deactivated first CSI report when a base station deactivates a semi-persistent CSI report through a MAC CE to a terminal, according to an embodiment of the present disclosure.

FIG. 15 is a diagram illustrating an example of the CPU occupation time for the deactivated first CSI report when the base station deactivates the semi-persistent CSI report to the UE through the MAC CE, according to an embodiment of the present disclosure.

15-00 of FIG. 15 is a diagram illustrating an example in which the base station deactivates semi-persistent CSI report #X and indicates to deactivate the CSI report #X transmission at UL slot n', according to an embodiment of the present disclosure.

The method according to an embodiment of the present disclosure may determine that there is no CPU occupation time for the deactivated CSI report. That is, the CPU occupation in the UE for CSI report #X at UL slot n' deactivated through MAC CE may not be considered. Accordingly, it may be determined that there is no CPU occupation time in the UE for CSI report #X at UL slot n' deactivated through MAC CE. The above-described method according to an embodiment of the present disclosure may not guarantee the time domain operation causality of the UE, but the CPU occupation for the deactivated CSI report is not considered. Therefore, unnecessary CPU occupation of the UE may be prevented and the channel information measurement capability of the UE may be efficiently utilized.

The method according to an embodiment of the present disclosure may determine the CPU occupation time considering a situation in which the CPU occupation ends when the UE recognizes that the CSI report is deactivated. The CPU occupation time for CSI report #X at UL slot n' deactivated through MAC CE may be determined as a CPU occupation time 1 15-15 from the start time point of the first symbol of the earliest transmitted CSI-RS/CSI-IM/SSB resource corresponding to the latest CSI-RS/CSI-IM/SSB occasion 15-05 among CSI-RS/CSI-IM/SSB occasions for CSI report #X to be transmitted at UL slot n', to the time point when the PDSCH 15-10 including MAC CE to deactivate CSI report #X at UL slot n' ends. The method of determining the CPU occupation time of the UE as the CPU occupation time 1 15-15 may prevent unnecessary CPU occupation for the deactivated CSI report, and may guarantee the time domain operation causality of the UE.

According to an embodiment of the present disclosure, the CPU occupation time may be determined considering that HARQ-ACK transmission for confirming whether the UE receives the MAC CE for deactivating the CSI report is followed. The CPU occupation time for CSI report #X at UL slot n' deactivated through MAC CE may be determined as a CPU occupation time 2 15-25 from the start time point of the first symbol of the earliest transmitted CSI-RS/CSI-IM/SSB resource corresponding to the latest CSI-RS/CSI-IM/SSB occasion 15-05 among CSI-RS/CSI-IM/SSB occasions for CSI report #X to be transmitted at UL slot n', to the time point when the last symbol occupied by the PUCCH or PUSCH 15-20 including HARQ-ACK transmission of the UE for MAC CE to deactivate CSI report #X at UL slot n' ends. The method of determining the CPU occupation time of the UE as the CPU occupation time 2 15-25 stops the CPU occupation after checking whether the UE receives the MAC CE for deactivating the CSI report, thereby preventing mistakes in determining the CPU occupation time when the MAC CE for deactivating the CSI report is not normally received.

According to an embodiment of the present disclosure, the CPU occupation time may be determined considering the delay time required until the MAC CE for deactivating the CSI report is actually applied. The CPU occupation time for CSI report #X at UL slot n' deactivated through MAC CE may be determined as a CPU occupation time 3 15-35 from the start time point of the first symbol of the earliest transmitted CSI-RS/CSI-IM/SSB resource corresponding to the latest CSI-RS/CSI-IM/SSB occasion 15-05 among CSI-RS/CSI-IM/SSB occasions for CSI report #X to be transmitted at UL slot n', to the time point after the MAC CE activation delay 15-30 from the time point at which the last symbol occupied by the PUCCH or PUSCH 15-20 including the HARQ-ACK transmission of the UE for the MAC CE to deactivate CSI report #X at UL slot n' ends. The method of determining the CPU occupation time of the UE as the CPU occupation time 3 15-35 may determine the CPU occupation time considering the delay time required until the MAC CE for deactivating the CSI report is actually applied to the UE. The MAC CE activation delay 15-30 represents the delay time taken until the MAC CE signaling of the base station is applied, may be determined to be 3 ms, or may be calculated that MAC CE signaling is applied from slots 3 $N_{slot}^{subframe,\mu}+1$ and later of the slot including the HARQ-ACK transmission of the UE for the MAC CE.

The method according to an embodiment of the present disclosure may determine that the CPU occupation time assumed before the UE recognizes that the CSI report is deactivated is assumed to be the same even after the UE is deactivated. The CPU occupation time for CSI report #X at UL slot n' deactivated through the MAC CE may be determined as CPU occupation time 4 15-45 from the start time point of the first symbol of the earliest transmitted CSI-RS/CSI-IM/SSB resource corresponding to the latest CSI-RS/CSI-IM/SSB occasion 15-05 among CSI-RS/CSI-IM/SSB occasions for CSI report #X to be transmitted at UL slot n', to the time point when the last symbol occupied by the PUCCH 15-40 including the deactivated CSI report #X scheduled at UL slot n' ends. The CPU occupation time assumed at the time point when the CPU occupation starts before the UE recognizes that the CSI report is deactivated is not changed even after the deactivation, thereby reducing the computational complexity for the CPU occupation or the CPU occupation time of the UE.

The method according to an embodiment of the present disclosure may determine that the CPU occupation time assumed before the UE recognizes that the CSI report is deactivated is assumed equally even after the deactivation, and may determine that the CPU occupation is stopped at the time point when the PUCCH including the CSI report is not transmitted because the CSI report is deactivated. The CPU occupation time for CSI report #X at UL slot n' deactivated through MAC CE may be determined as a CPU occupation time 5 15-50 from the start time point of the first symbol of the earliest transmitted CSI-RS/CSI-IM/SSB resource corresponding to the latest CSI-RS/CSI-IM/SSB occasion 15-05 among CSI-RS/CSI-IM/SSB occasions for CSI report #X to be transmitted at UL slot n', to the time point when the first symbol occupied by the PUCCH 15-40 including the deactivated CSI report #X scheduled at UL slot n' starts.

The CPU occupation time assumed at the time point the CPU occupation starts before the UE recognizes that the CSI report is deactivated is not changed even after the deactivation, and the CPU occupation is stopped at the time point when the PUSCH including the CSI report is not transmitted, thereby preventing unnecessary CPU occupation of the UE.

Also, the method according to an embodiment of the present disclosure may determine the CPU occupation time for the deactivated CSI report by semi-static or dynamical change through higher layer signaling. For example, the CPU occupation time for CSI report #X at UL slot n' deactivated through DCI may be determined as the CPU occupation time 3 15-35 or the CPU occupation time 4 15-45, and the base station may indicate whether to determine the CPU occupation time as the CPU occupation time 3 15-35 or the CPU occupation time 4 15-45 through higher layer signaling including RRC signaling. Alternatively, the base station may indicate whether to determine the CPU occupation time as the CPU occupation time 3 15-35 or the CPU occupation time 4 15-45 through MAC CE for deactivating the CSI report. When the base station indicates the method of determining the CPU occupation time through MAC CE for deactivating the CSI report, the MAC CE may include one or more additional bits for determining the CPU occupation time, and the interpretation of the bits included in the MAC CE may be changed. The CPU occupation time for the deactivated CSI report is changed semi-statically or dynamically through higher layer signaling or DCI. Therefore, it is possible to prevent unnecessary CPU occupation of the UE by stopping the CPU occupation early according to the situation. The terminal may efficiently utilize the channel information calculation capability. By not changing the assumption for the CPU occupation time, it is possible to reduce the computational complexity of the CPU occupation or the CPU occupation time of the UE.

The method of determining the CPU occupation time for the deactivated CSI report by semi-static or dynamical change through higher layer signaling is not limited to the CPU occupation time indication for the CPU occupation time 3 15-35 or the CPU occupation time 4 15-45, and may be equally applied to the CPU occupation time 1 15-15, the CPU occupation time 2 15-25, the CPU occupation time 3 15-35, the CPU occupation time 4 15-45, or the CPU occupation time 5 15-50.

(2-3)th Embodiment: A Method of Forcing to Guarantee Time Domain Operation Causality of the UE when Semi-Persistent CSI Report is Deactivated Hereinafter, a method of preventing the CPU occupation time of the UE for the deactivated CSI report from being considered by forcing to ensure the time domain operation causality of the UE for the deactivated CSI report when the base station deactivates the semi-persistent CSI report to the UE through higher layer signaling including MAC CE or DCI, according to an embodiment of the present disclosure, will be described. For example, the start time point of the deactivation operation for the CSI report is limited so that the start time of the CSI report deactivation operation through higher layer signaling or DCI is not later than the start time point of the CPU occupation time for the deactivated CSI report, or the UE may not expect a case in which the start time point of the CSI report deactivation operation through higher layer signaling or DCI is later than the start time point of the CPU occupation time for the deactivated CSI report.

Figure 16:
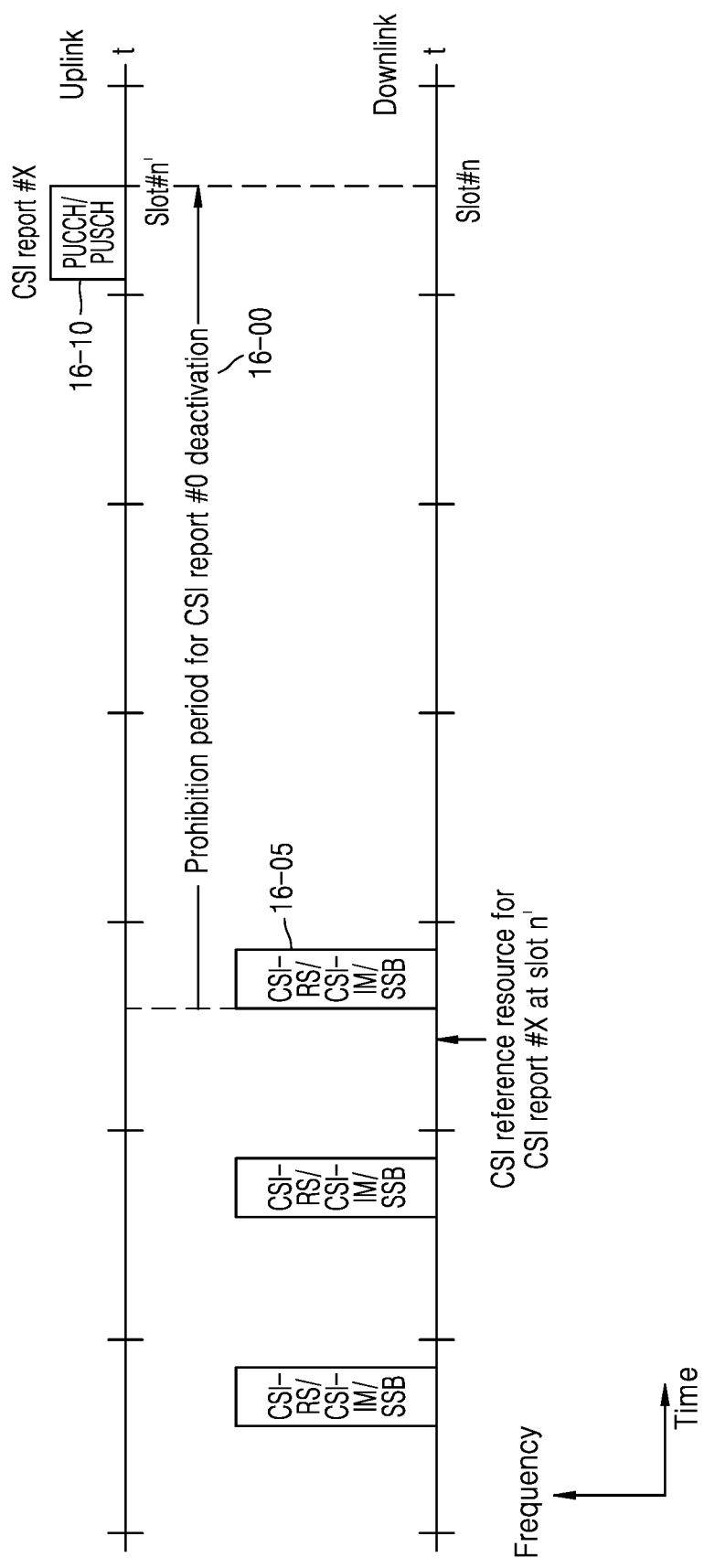
FIG. 16 is a diagram illustrating an example of a prohibition period for a CSI report deactivation so that a CSI report deactivation operation time point is not later than a start time point of a CPU occupation time for a deactivated CSI report when a base station deactivates a CSI report to a terminal, according to an embodiment of the present disclosure.

FIG. 16 is a diagram illustrating an example of a prohibition period for a CSI report deactivation so that a CSI report deactivation operation time point is not later than a start time point of a CPU occupation time for a deactivated CSI report when a base station deactivates a CSI report to a UE, according to an embodiment of the present disclosure.

The method according to an embodiment of the present disclosure may force the start time point of the CSI report deactivation operation through higher layer signaling or DCI not to be later than the start time point of the CPU occupation time for the deactivated CSI report. The prohibition period 16-00 of the deactivation operation time for CSI report #X to be transmitted at UL slot n' may be determined from the start time point of the first symbol of the earliest transmitted CSI-RS/CSI-IM/SSB resource corresponding to the latest CSI-RS/CSI-IM/SSB occasion 16-05 among CSI-RS/CSI-IM/SSB occasions for CSI report #X to be transmitted at UL slot n', to the time point when the last symbol occupied by a PUCCH or PUSCH 16-10 including CSI report #X to be transmitted at UL slot n' ends. According to an embodiment of the present disclosure, in the prohibition period 16-00 of the deactivation operation time point for CSI report #X to be transmitted at UL slot n', the base station may be forced not to indicate the deactivation of CSI report #X through higher layer signaling or DCI. Because the base station is forced not to indicate the deactivation during the prohibition period 16-00 of the deactivation operation time point for CSI report #X, the UE may not consider the deactivation of the CSI report after the CPU occupation for the CSI report starts. Accordingly, the implementation complexity for the CPU occupation or CPU occupation time of the UE may be reduced.

According to an embodiment of the present disclosure, the UE may not expect a case in which the start time point of the CSI report deactivation operation through higher layer signaling or DCI is later than the start time point of the CPU occupation time for the deactivated CSI report. When the base station indicates the deactivation of CSI report #X through higher layer signaling or DCI in the prohibition period 16-00 of the deactivation operation time point for CSI report #X to be transmitted at UL slot n', the UE may transmit the PUCCH or PUSCH 16-10 including CSI report #X at UL slot n', or the UE itself may determine whether to transmit the PUCCH or PUSCH 16-10 including CSI report #X. Also, the UE itself may determine the CPU occupation time for CSI report #X to be transmitted at UL slot n' within the prohibition period 16-00 of the deactivation operation time point of CSI report #X to be transmitted at UL slot n'. Because the UE is allowed to determine whether to deactivate the CSI report by itself after the CPU occupation for the CSI report starts, the implementation complexity for the CPU occupation or CPU occupation time of the UE may be reduced.

Figure 17:
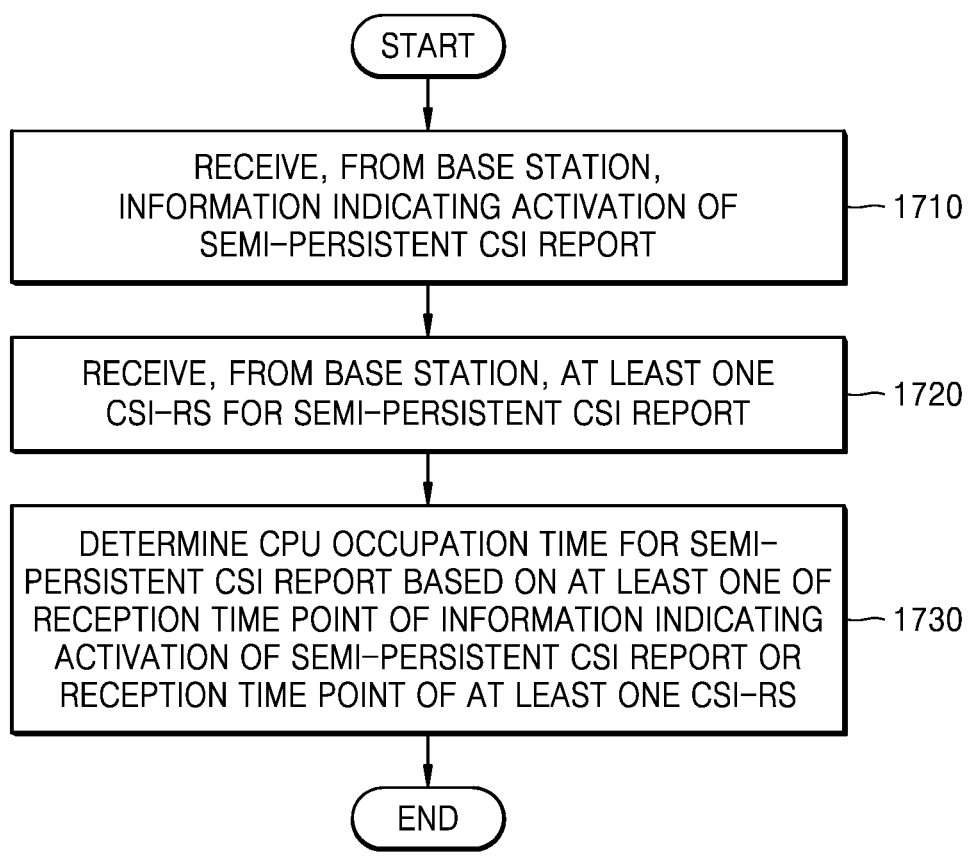
FIG. 17 is a flowchart of a method, performed by a terminal, of determining a CPU occupation time, according to an embodiment of the present disclosure.

FIG. 17 is a flowchart of a method, performed by a UE, of determining a CPU occupation time, according to an embodiment of the present disclosure.

Referring to FIG. 17, in operation 1710, the UE may receive, from the base station, information indicating activation of a semi-persistent CSI report. The information indicating the activation of the semi-persistent CSI report may be transmitted by being included in DCI or MAC CE.

In operation 1720, the UE may receive, from the base station, at least one CSI-RS for the semi-persistent CSI report. The at least one CSI-RS may correspond to "CSI-RS/CSI-IM/SSB occasion" of the present disclosure or a part thereof.

In operation 1730, the UE may determine the CPU occupation time for semi-persistent CSI report based on at least one of a reception time point of the information indicating the activation of the semi-persistent CSI report or a reception time point of the at least one CSI-RS. As the method, performed by the UE, of determining the CPU occupation time for the semi-persistent CSI report, at least some of the various methods described with reference to FIGS. 1 to 16 of the present disclosure may be applied.

Figure 18:
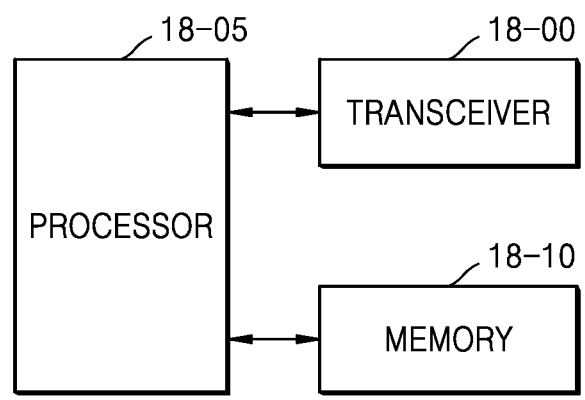
FIG. 18 is a block diagram illustrating a structure of a terminal, according to an embodiment of the present disclosure.

FIG. 18 is a block diagram illustrating a structure of a UE, according to an embodiment of the present disclosure.

Referring to FIG. 18, the UE may include a transceiver 18-00, a memory 18-10, and a processor 18-05. The transceiver 18-00, the processor 18-05, and the memory 18-10 of the UE may operate according to the communication method of the UE described above. However, the elements of the UE are not limited to the above-described example. For example, the UE may include more or fewer elements than the above-described elements. In addition, the transceiver 18-00, the processor 18-05, and the memory 18-10 may be implemented in the form of a single chip. Also, the processors 18-05 may include one or more processors.

The transceiver 18-00 collectively refers to a receiver of the UE and a transmitter of the UE, and may transmit and receive signals to and from the base station. The signal transmitted and received to and from the base station may include control information and data. To this end, the transceiver 18-00 may include a radio frequency (RF) transmitter that up-converts and amplifies a frequency of a signal to be transmitted, and an RF receiver that low-noise amplifies and down-converts a received signal. However, this is only an embodiment of the transceiver 18-00, and the elements of the transceiver 18-00 are not limited to the RF transmitter and the RF receiver.

Also, the transceiver 18-00 may receive a signal through a radio channel, may output the received signal to the processor 18-05, and may transmit a signal output from the processor 18-05 through a radio channel.

The memory 18-10 may store programs and data necessary for the operation of the UE. In addition, the memory 18-10 may store control information or data included in the signal obtained from the UE. The memory 18-10 may include a storage medium such as read-only memory (ROM), random access memory (RAM), hard disk, compact disc-random access memory (CD-ROM), and digital versatile disc (DVD), or any combination thereof. Also, the memory 18-10 may not exist separately and may be included in the processor 18-05.

The processor 18-05 may control a series of processes so that the UE is able to operate according to the above-described embodiments of the present disclosure. For example, the processor 18-05 may receive a control signal and a data signal through the transceiver 18-00, and may process the received control signal and data signal. Also, the processor 18-05 may transmit the processed control signal and data signal through the transceiver 18-00. In addition, the processor 18-05 may receive DCI including two layers and control the elements of the UE to simultaneously receive a plurality of PDSCHs.

According to an embodiment of the present disclosure, the processor 18-05 may control the transceiver 18-00 to receive, from the base station, information indicating the activation of the semi-persistent CSI report, may control the transceiver 18-00 to receive, from the base station, at least one CSI-RS for the semi-persistent CSI report, and may determine the CPU occupation time for the semi-persistent CSI report based on at least one of the reception time point of the information indicating the activation of the semi-persistent CSI report or the reception time point of the at least one CSI-RS. The information indicating the activation of the semi-persistent CSI report may be transmitted by being included in DCI or MAC CE.

According to an embodiment of the present disclosure, the processor 18-05 may determine, as the start time point of the CPU occupation time, the reception time point (first time point) of the first symbol of the last CSI-RS received in the slot that is not later than the reference slot in which reference resource for channel information measurement reported in the semi-persistent CSI report is located among the at least one CSI-RS. For example, the UE may determine the reference slot in which the reference resource is located, based on numerology. For example, the UE may determine that the reference slot in which the reference resource for the semi-persistent CSI report to be transmitted at the n-th slot is located is an n−$n_{csi\_ref}$-th slot. Also, for example, the method of determining the reference slot in which the reference resource for the semi-persistent CSI report to be transmitted at the n-th slot is located may be configured from the base station by the UE.

According to an embodiment of the present disclosure, the processor 18-05 may determine, as the start time point of the CPU occupation time, the time point (second time point) when the reception of DCI indicating the activation of the semi-persistent CSI report is completed or the symbol (third time point) located after the decoding time for DCI from the second time point.

According to an embodiment of the present disclosure, the processor 18-05 may determine, as the start time point of the CPU occupation time, the time point (fourth time point) after the MAC CE activation delay, which is the time required for the MAC CE to be applied to the UE, from the time point when HARQ-ACK transmission for MAC CE indicating the activation of the semi-persistent CSI report is completed.

According to an embodiment of the present disclosure, the processor 18-05 may control the transceiver 18-00 to transmit the semi-persistent CSI report to the base station, and may determine, as the end time point of the CPU occupation time, the time point when the transmission of the semi-persistent CSI report to the base station is completed.

According to an embodiment of the present disclosure, the processor 18-05 may control the transceiver 18-00 to receive, from the base station, the information indicating the deactivation of the semi-persistent CSI report, and may determine the end time point of the CPU occupation time based on the reception time point of the information indicating the deactivation of the semi-persistent CSI report. The information indicating the deactivation of the semi-persistent CSI report may be transmitted by being included in another DCI or another MAC CE.

According to an embodiment of the present disclosure, the processor 18-05 may determine, as the end time point of the CPU occupation time, the time point (fifth time point) when the reception of another DCI indicating the deactivation of the semi-persistent CSI report is completed or the symbol (sixth time point) located after the decoding time for another DCI from the fifth time point.

According to an embodiment of the present disclosure, the processor 18-05 may determine, as the end time point of the CPU occupation time, the time point (seventh time point) when HARQ-ACK transmission to another MAC CE indicating the deactivation of the semi-persistent CSI reporting is completed, or the time point (eighth time point) after another MAC CE activation delay, which is the time required for another MAC CE to be applied to the UE from the seventh time point.

According to an embodiment of the present disclosure, the processor 18-05 may determine, as the end time point of the CPU occupation time, the transmission start time point (ninth time point) or the transmission completion time point (tenth time point) scheduled for the deactivated semi-persistent CSI report.

According to an embodiment of the present disclosure, the processor 18-05 may determine a plurality of time intervals indicating the CPU occupation time based on at least one of the reception time point of the information indicating the activation of the semi-persistent CSI report, the reception time point of the at least one CSI-RS, the reception time point of the information indicating the deactivation of the semi-persistent CSI report, the transmission time point of the semi-persistent CSI report, or the transmission scheduled time point of the semi-persistent CSI report, and may determine one of the time intervals as the CPU occupation time based on a comparison between the time intervals.

According to an embodiment of the present disclosure, the processor 18-05 may control the transceiver 18-00 to receive the information indicating the CPU occupation time for the deactivated semi-persistent CSI report or the information indicating the method of determining the CPU occupation time from the base station through higher layer signaling or another DCI, and may determine, as the CPU occupation time, the CPU occupation time indicated by the base station.

According to an embodiment of the present disclosure, the processor 18-05 may control the transceiver 18-00 to transmit the semi-persistent CSI report to the base station, and to transmit the semi-persistent CSI report to the base station even when the information indicating the deactivation of the semi-persistent CSI report is received after the start time point of the determined CPU occupation time.

Figure 19:
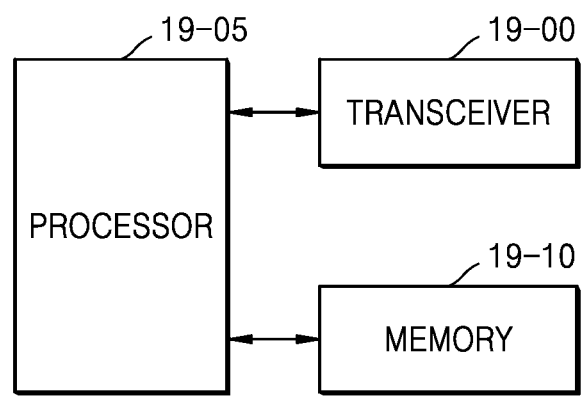
FIG. 19 is a block diagram illustrating a structure of a base station, according to an embodiment of the present disclosure.

FIG. 19 is a block diagram illustrating a structure of a base station, according to an embodiment of the present disclosure.

Referring to FIG. 19, the base station may include a transceiver 19-00, a memory 19-10, and a processor 19-05. The transceiver 19-00, the processor 19-05, and the memory 19-10 of the base station may operate according to the communication method of the base station described above. However, the elements of the base station are not limited to the above-described example. For example, the base station may include more or fewer elements than the above-described elements. In addition, the transceiver 19-00, the processor 19-05, and the memory 19-10 may be implemented in the form of a single chip. Also, the processors 19-05 may include one or more processors.

The transceiver 19-00 collectively refers to a receiver of the base station and a transmitter of the base station, and may transmit and receive signals to and from the UE. The signals transmitted and received to and from the UE may include control information and data. To this end, the transceiver 19-00 may include an RF transmitter that up-converts and amplifies a frequency of a signal to be transmitted, and an RF receiver that low-noise amplifies and down-converts a received signal. However, this is only an embodiment of the transceiver 19-00, and the elements of the transceiver 19-00 are not limited to the RF transmitter and the RF receiver.

Also, the transceiver 19-00 may receive a signal through a radio channel, may output the received signal to the processor 19-05, and may transmit a signal output from the processor 19-05 through a radio channel.

The memory 19-05 may store programs and data necessary for the operation of the base station. In addition the memory 19-05 may store control information or data included in the signal obtained from the base station. The memory 19-05 may include a storage medium such as ROM, RAM, hard disk, CD-ROM, and DVD, or any combination thereof. Also, the memory 19-10 may not exist separately and may be included in the processor 19-05.

The processor 19-05 may control a series of processes so that the base station is able to operate according to the above-described embodiments of the present disclosure. For example, the processor 19-05 may receive a control signal and a data signal through the transceiver 19-00, and may process the received control signal and data signal. Also, the processor 19-05 may transmit the processed control signal and data signal through the transceiver 19-00. Also, the processor 19-05 may configure DCI including allocation information for the PDSCH and may control each component of the base station in order to transmit the DCI.

According to an embodiment of the present disclosure, the processor 19-05 may control the transceiver 19-00 to transmit the information indicating the CPU occupation time for the semi-persistent CSI report or the information indicating the method of determining the CPU occupation time to the UE through higher layer signaling or another DCI.

The methods according to the embodiments of the present disclosure, which are described in the claims or the detailed description, may be implemented as hardware, software, or a combination of hardware and software.

When implemented as software, a computer-readable storage medium or a computer program product storing one or more programs (software modules) may be provided. One or more programs stored in the computer-readable storage medium or the computer program product are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in RAM, non-volatile memory including flash memory, ROM, electrically erasable programmable read only memory (EEPROM), magnetic disc storage device, CD-ROM, DVD, other types of optical storage devices, or magnetic cassette. Alternatively, one or more programs may be stored in a memory provided by a combination of all or part of these devices. Also, each memory may include a plurality of configured memories.

Also, the programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiments of the present disclosure.

In specific embodiments of the present disclosure, the elements included in the present disclosure have been expressed in the singular or plural form according to the suggested specific embodiments. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, the embodiments disclosed in the present specification and drawings are only presented as specific examples to easily explain the technical contents of the present disclosure and help the understanding of the present disclosure, and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, parts of one embodiment and another embodiment of the present disclosure may be combined with each other. For example, parts of the first embodiment and the second embodiment of the present disclosure may be combined with each other so that the base station and the UE operate. In addition, the embodiments may be implemented in other systems, for example, LTE systems, 5G or NR systems, and other modifications based on the technical idea of the embodiments described above.

The invention claimed is:

1. A method, performed by a terminal, of identifying a channel state information (CSI) processing unit occupation time in a wireless communication system, the method comprising:
receiving, from a base station, information indicating activation of a semi-persistent CSI report through downlink control information (DCI) or a medium access control (MAC) control element (CE);
receiving, from the base station, at least one CSI-reference signal (RS) for the semi-persistent CSI report; and
identifying the CSI processing unit occupation time for the semi-persistent CSI report based on at least one of a reception time point of the information indicating the activation of the semi-persistent CSI report or a reception time point of the at least one CSI-RS,
wherein the identifying of the CSI processing unit occupation time comprises identifying, as a start time point of the CSI processing unit occupation time, a time point after an MAC CE activation delay, which is a time required for the MAC CE to be applied to the terminal, from a time point when a hybrid automatic repeat request acknowledgement (HARQ-ACK) transmission for the MAC CE indicating the activation of the semi-persistent CSI report ends.

2. The method of claim 1, wherein the start time point of the CSI processing unit occupation time corresponds to a reception time point of a first symbol of a last CSI-RS received in a slot that is not later than a reference slot in which reference resource for channel information measurement reported in the semi-persistent CSI report is located among the at least one CSI-RS.

3. The method of claim 1, wherein the identifying of the CSI processing unit occupation time comprises identifying, as the start time point of the CSI processing unit occupation time, a first time point when a reception of the DCI indicating the activation of the semi-persistent CSI report ends or a symbol located after a decoding time for the DCI from the first time point.

4. The method of claim 1, further comprising:
receiving, from the base station, information indicating deactivation of the semi-persistent CSI report through another DCI or another MAC CE; and
identifying an end time point of the CSI processing unit occupation time based on a reception time point of the information indicating the deactivation of the semi-persistent CSI report.

5. The method of claim 4, wherein the identifying of the end time point of the CSI processing unit occupation time comprises identifying, as the end time point of the CSI processing unit occupation time, a second time point when a reception of the another DCI indicating the deactivation of the semi-persistent CSI report ends or a symbol located after a decoding time for the another DCI from the second time point.

6. The method of claim 4, wherein the identifying of the end time point of the CSI processing unit occupation time comprises identifying, as the end time point of the CSI processing unit occupation time, a third time point when an HARQ-ACK transmission for the another MAC CE indicating the deactivation of the semi-persistent CSI report ends, or a time point after another MAC CE activation delay, which is a time required for the another MAC CE to be applied to the terminal from the third time point.

7. The method of claim 4, wherein the identifying of the end time point of the CSI processing unit occupation time comprises identifying, as the end time point of the CSI processing unit occupation time, a transmission start time point or a transmission end time point scheduled for the deactivated semi-persistent CSI report.

8. The method of claim 1, wherein the identifying of the CSI processing unit occupation time comprises:
   identifying a plurality of time intervals associated with the CSI processing unit occupation time based on at least one of the reception time point of the information indicating the activation of the semi-persistent CSI report, the reception time point of the at least one CSI-RS, a reception time point of information indicating deactivation of the semi-persistent CSI report, a transmission time point of the semi-persistent CSI report, or a transmission scheduled time point of the semi-persistent CSI report; and
   identifying one of the plurality of time intervals as the CSI processing unit occupation time based on a comparison between the plurality of time intervals.

9. The method of claim 4, further comprising:
   receiving information indicating the CSI processing unit occupation time for the deactivated semi-persistent CSI report or information indicating a method of identifying the CSI processing unit occupation time from the base station through higher layer signaling or the another DCI,
   wherein the identifying of the CSI processing unit occupation time comprises identifying, as the CSI processing unit occupation time, a CSI processing unit occupation time indicated by the base station.

10. The method of claim 1, further comprising:
    transmitting the semi-persistent CSI report to the base station even when information indicating deactivation of the semi-persistent CSI report is received after the start time point of the CSI processing unit occupation time.

11. A terminal for identifying a channel state information (CSI) processing unit occupation time in a wireless communication system, the terminal comprising:
    a transceiver; and
    at least one processor configured to:
       control the transceiver to receive, from a base station, information indicating activation of a semi-persistent CSI report through downlink control information (DCI) or a medium access control (MAC) control element (CE);
       control the transceiver to receive, from the base station, at least one CSI-reference signal (RS) for the semi-persistent CSI report; and
       identify the CSI processing unit occupation time for the semi-persistent CSI report based on at least one of a reception time point of the information indicating the activation of the semi-persistent CSI report or a reception time point of the at least one CSI-RS,
    wherein the identifying of the CSI processing unit occupation time comprises identifying, as a start time point of the CSI processing unit occupation time, a time point after an MAC CE activation delay, which is a time required for the MAC CE to be applied to the terminal, from a time point when a hybrid automatic repeat request acknowledgement (HARQ-ACK) transmission for the MAC CE indicating the activation of the semi-persistent CSI report ends.

12. The terminal of claim 11, wherein the at least one processor is further configured to:
    control the transceiver to receive, from the base station, information indicating deactivation of the semi-persistent CSI report through another DCI or another MAC CE; and
    identify an end time point of the CSI processing unit occupation time based on a reception time point of the information indicating the deactivation of the semi-persistent CSI report.

13. The terminal of claim 11, wherein the at least one processor is further configured to:
    control the transceiver to transmit the semi-persistent CSI report to the base station even when information indicating deactivation of the semi-persistent CSI report is received after the start time point of the CSI processing unit occupation time.

14. The terminal of claim 12, wherein the identifying of the end time point of the CSI processing unit occupation time comprises identifying, as the end time point of the CSI processing unit occupation time, a second time point when a reception of the another DCI indicating the deactivation of the semi-persistent CSI report ends or a symbol located after a decoding time for the another DCI from the second time point.

15. The terminal of claim 12, wherein the identifying of the end time point of the CSI processing unit occupation time comprises identifying, as the end time point of the CSI processing unit occupation time, a third time point when a HARQ-ACK transmission for the another MAC CE indicating the deactivation of the semi-persistent CSI report ends, or a time point after another MAC CE activation delay, which is a time required for the another MAC CE to be applied to the terminal from the third time point.

16. The terminal of claim 12, wherein the identifying of the end time point of the CSI processing unit occupation time comprises identifying, as the end time point of the CSI processing unit occupation time, a transmission start time point or a transmission end time point scheduled for the deactivated semi-persistent CSI report.

17. The terminal of claim 11, wherein the identifying of the CSI processing unit occupation time comprises:
    identifying a plurality of time intervals associated with the CSI processing unit occupation time based on at least one of the reception time point of the information indicating the activation of the semi-persistent CSI report, the reception time point of the at least one CSI-RS, a reception time point of information indicating deactivation of the semi-persistent CSI report, a transmission time point of the semi-persistent CSI report, or a transmission scheduled time point of the semi-persistent CSI report; and
    identifying one of the plurality of time intervals as the CSI processing unit occupation time based on a comparison between the plurality of time intervals.

18. The terminal of claim 12,
    wherein the at least one processor is further configured to control the transceiver to receive information indicating the CSI processing unit occupation time for the deactivated semi-persistent CSI report or information indicating a method of identifying the CSI processing unit occupation time from the base station through higher layer signaling or the another DCI, and wherein the identifying of the CSI processing unit occupation time comprises identifying, as the CSI processing unit occupation time, a CSI processing unit occupation time indicated by the base station.

19. The terminal of claim 11, wherein the start time point of the CSI processing unit occupation time corresponds to a reception time point of a first symbol of a last CSI-RS received in a slot that is not later than a reference slot in which reference resource for channel information measurement reported in the semi-persistent CSI report is located among the at least one CSI-RS.

20. The terminal of claim 11, wherein the identifying of the CSI processing unit occupation time comprises identifying, as the start time point of the CSI processing unit occupation time, a first time point when a reception of the DCI indicating the activation of the semi-persistent CSI report ends or a symbol located after a decoding time for the DCI from the first time point.

* * * * *